(12) United States Patent
Furlotti et al.

(10) Patent No.: US 11,432,052 B1
(45) Date of Patent: Aug. 30, 2022

(54) USER GENERATED AND CURATED VIDEO CONTENT STREAMING ON-DEMAND THROUGH A DIGITAL COMPETITION ENVIRONMENT

(71) Applicant: You Rip, Inc., El Segundo, CA (US)

(72) Inventors: Patrick Furlotti, El Sequndo, CA (US); Christine Satchell, Brighton (AU)

(73) Assignee: YOU RIP, INC., El Sequndo, CA (US)

( * ) Notice: Subject to any disclaimer, the term of this patent is extended or adjusted under 35 U.S.C. 154(b) by 0 days.

(21) Appl. No.: 17/486,176

(22) Filed: Sep. 27, 2021

(51) Int. Cl.
*H04N 21/234* (2011.01)
*H04N 21/254* (2011.01)
*H04N 21/44* (2011.01)
*G06Q 30/02* (2012.01)
*H04N 21/8549* (2011.01)
*H04N 21/472* (2011.01)
*H04N 21/4784* (2011.01)
*H04N 21/442* (2011.01)

(52) U.S. Cl.
CPC ... *H04N 21/8549* (2013.01); *H04N 21/23424* (2013.01); *H04N 21/44204* (2013.01); *H04N 21/4784* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 8,903,834 B2 | 12/2014 | Ciancutti et al. | |
| 9,088,808 B1 | 7/2015 | He et al. | |
| 9,113,208 B2 | 8/2015 | Belyaev et al. | |
| 9,430,532 B2 | 8/2016 | Basillico | |
| 9,854,310 B2 | 12/2017 | Ali et al. | |
| 9,877,055 B2 | 1/2018 | Wilms et al. | |
| 9,999,836 B2 | 6/2018 | Lampe et al. | |
| 10,889,744 B2 | 1/2021 | Knight et al. | |
| 10,898,815 B1 * | 1/2021 | Jia | H04N 21/2668 |
| 2011/0191684 A1 | 8/2011 | Greenberg | |
| 2013/0283301 A1 * | 10/2013 | Avedissian | H04N 21/4223 725/5 |
| 2014/0215508 A1 | 7/2014 | Wyatt et al. | |

(Continued)

OTHER PUBLICATIONS

Netflix, How Netflix's Recommendation System Works, webpage, accessed Jul. 19, 2021, 4 pages.

(Continued)

*Primary Examiner* — Brian T Pendleton
*Assistant Examiner* — Jean D Saint Cyr
(74) *Attorney, Agent, or Firm* — Standley Law Group LLP; Jeffrey S. Standley; Adam J. Smith

(57) ABSTRACT

Systems and methods for providing user generated and curated video content streaming on-demand to facilitate and incentivize digital competition are provided. Information regarding challenges to be electronically displayed at a platform are associated with tags, and video clips uploaded in response which are associated with the tags of the challenge. The video clips are formatted and made available for electronic interaction by fans at the platform. Certain of said video clips are selected for incorporation into highlight reels. Advertising is inserted into the highlight reels and payments are disbursed to content generators associated with the video clips in the highlight reels for which payment is received.

20 Claims, 17 Drawing Sheets

(56) References Cited

U.S. PATENT DOCUMENTS

2015/0067724 A1    3/2015    Johnson et al.
2017/0006322 A1*   1/2017    Dury .................... H04N 21/254
2017/0127102 A1    5/2017    Yin

OTHER PUBLICATIONS

Cooper, Paige, Hootsuite, How Does the YouTube Algorithm Work in 2021? The Complete Guide., blog post, acessed Jul. 16, 2021, 25 pages.
Newton, Casey, The Verge, How YouTube Perfected The Feed, webpage, Aug. 30, 2017, 7 pages.
Perez, Sarah, TikTok Explains How The Recommendation System Behind its 'For You' Feed Works, webpage, Jun. 18, 2020, 10 pages.
TikTok, How TikTok recommends videos #ForYou, webpage, accessed Jul. 16, 2021, 8 pages.

* cited by examiner

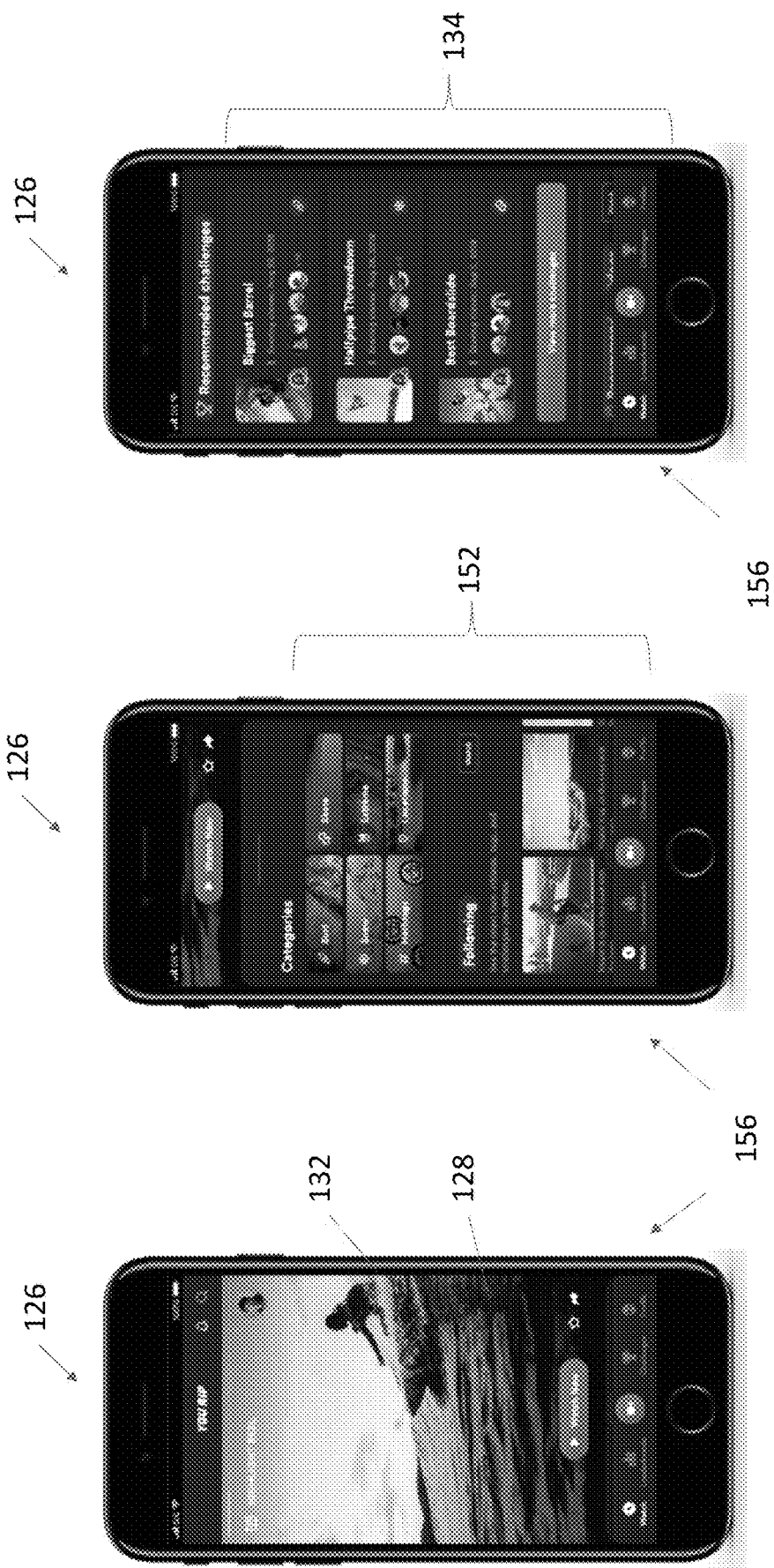

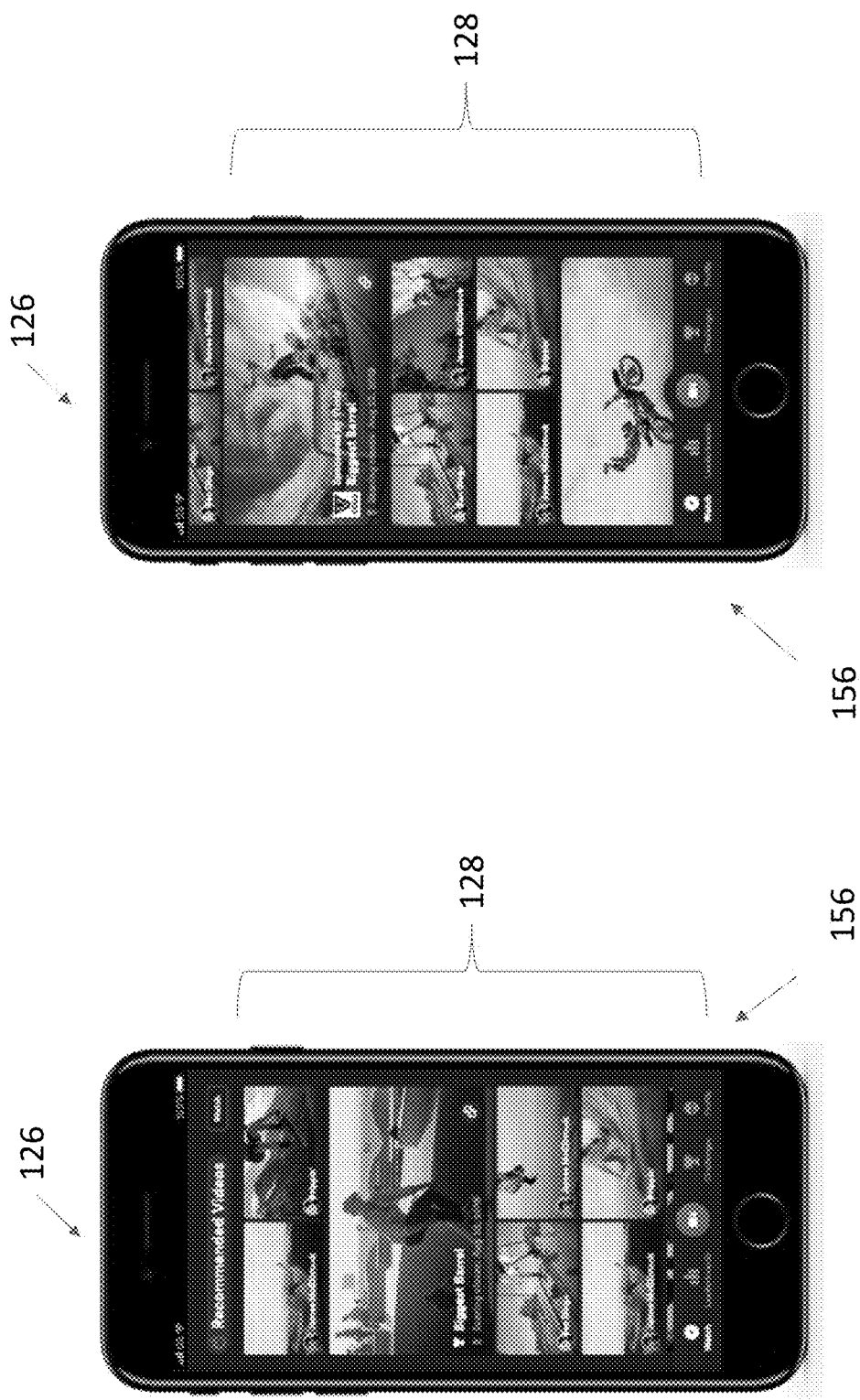

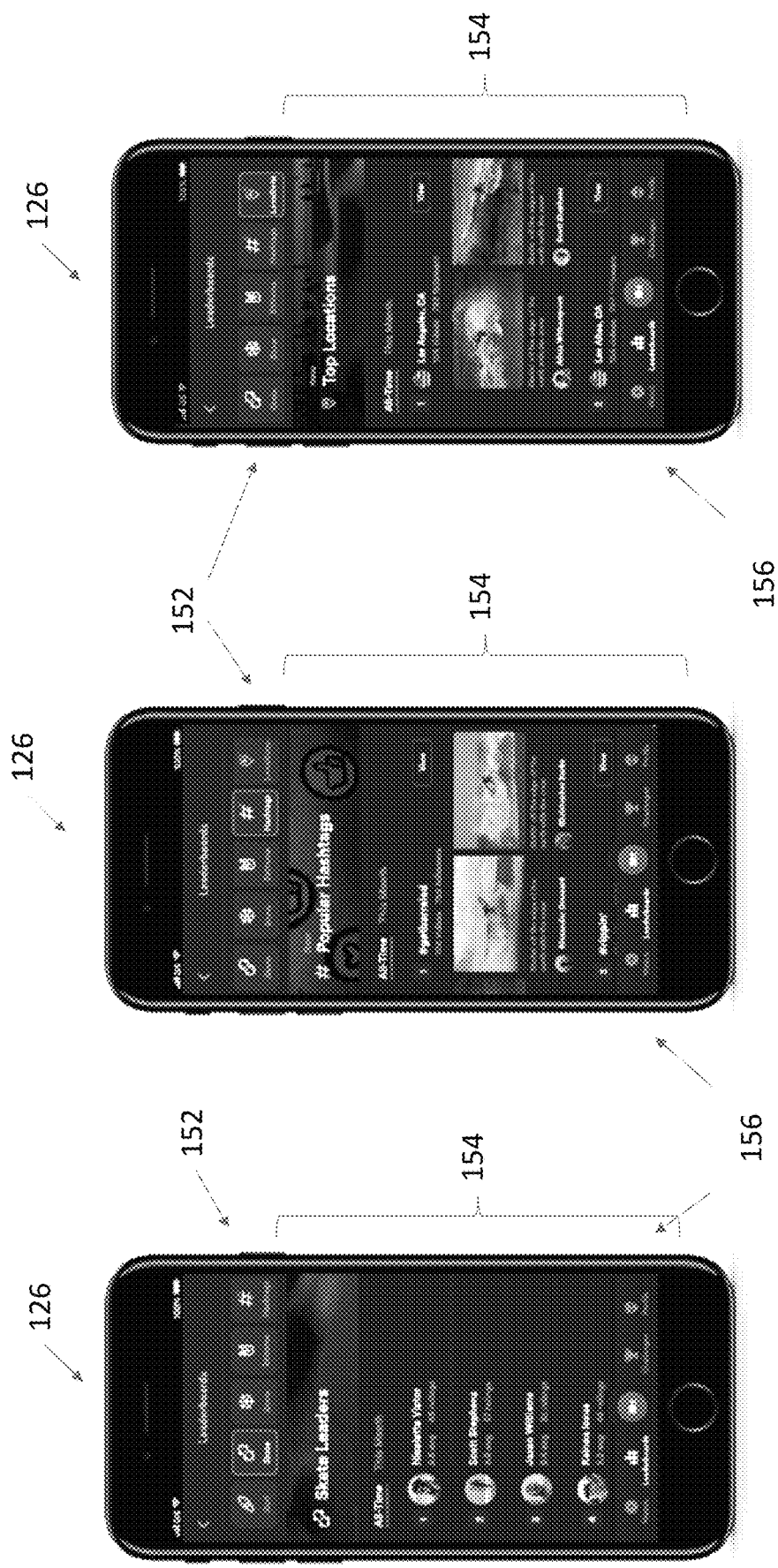

USER GENERATED AND CURATED VIDEO CONTENT STREAMING ON-DEMAND THROUGH A DIGITAL COMPETITION ENVIRONMENT

CROSS-REFERENCE TO RELATED APPLICATIONS

This application makes no priority claim.

TECHNICAL FIELD

Exemplary embodiments relate generally to systems and methods for user generated video content streaming on-demand.

BACKGROUND AND SUMMARY OF THE INVENTION

Organized competition events are often held for various extreme sports. Organizers of these events sometimes have an incentive to ensure that sponsored athletes are heavily featured in such organized competitions. Sponsors, who financially support the organized events, want air time for their athletes and their brand. Sometimes, competition organizers are hesitant to allow local athletes to participate in such events out of fear that they might take air time away from sponsored athletes. This brings about a need for an alternative, digital competition arena.

The current pandemic environment has reinforced this need. Extreme sports athletes are often able to continue their sports safely on an individual basis, but the ability to host large, organized competitions is not always possible or desirable.

One benefit of organized competition is that the organizers generally provide for the publicization, videography, and publication of the event. It is generally in the organizers interest to publicize the event as far and wide as possible to maximize exposure, which drives ticket sales, sponsorship and advertising revenue, and the like.

Proper publicization, videography, and publication requires a significant investment, which is why it is generally provided by the competition organizers. Further, individual athletes cannot generally film themselves in a manner which provides the kind and quality of video which attracts sponsors, advertisers, viewers, producers, TV networks, and other media providers. This is particularly true of extreme sports which often require specialized equipment, skills, or particular videography styles for capturing the kind of content desired by media providers. For example, filming extreme sports like surfing in a desirable way may require waterproof equipment, drones, and the like. As another example, filming extreme sports like skateboarding may require gimbled equipment and the ability for videographers to follow the athlete on a second skateboard or the like. Individual videographers may not have the necessary resources to provide such videography, and individual athletes may not have the necessary resources to compensate such individual videographers. This brings about a need for a digital content sharing platform that rewards individual athletes and videographers for their contributions.

The sharing of content between users can bring about privacy concerns for certain athletes, videographers, and viewers. This brings about a need for a digital content sharing platform that provides privacy controls.

The digitizing of competition can bring about concerns for manipulation. This brings about a need for a digital content sharing platform which provides democratized or regulated competition within the digital environment.

Therefore, what is needed is a digital competition environment which addresses at least some of these concerns. Systems and methods for providing a digital competition environment based on user generated video content streaming on-demand are provided. In exemplary embodiments, the systems and methods include hosting one or more websites and/or applications forming a content platform which facilitate such digital competition.

The aforementioned needs and concerns present unique technological challenges which are overcome by the disclosed systems and methods. For example, content and quality of video is a driving factor in the willingness of, and price at which, advertisers to purchase advertising space or media providers buy footage for broadcast. However, when content is generated from various users using various types and kinds of equipment, a technical challenge is presented as to how to automatically and efficiently select and transform individual video clips into a desirable highlight reel which can potentially generate revenue. The provided systems and methods overcome this technical challenge by automatically selecting, formatting, compiling, and publishing video clips in a manner desirable for purchasers of advertising space and/or footage to generate revenue, a portion of which may be disbursed to the respective content generators (e.g., athletes and videographers) to incentivize participation.

Digital competition may be facilitated by hosting digital challenges for athletes to fulfill posted at the website(s) and/or application(s). Athletes, videographers, and other content generators may upload videos of the athletes or other participants fulfilling one or more of the challenges. These videos may be received by the system and published for viewing. A period of user interaction with the videos may be permitted. Such user interaction may include viewing, sharing, commenting, rating, voting, or the like. This interaction may be used to automatically select desirable clips for inclusion in a highlight reel. A portion of the revenue from the sales of the highlight reels may be shared with the content generators whose videos appear in the highlight reel. Alternatively, or additionally, advertising content may be automatically inserted into the highlight reels in exemplary embodiments for revenue generation, a portion of which may be shared with the content generators whose videos appear in the highlight reel.

Such highlight reels may also be used as part of a watch feature within the platform.

Sponsored challenges may also be posted within the website(s) and/or application(s) which provide prize money to winners. Winners may be determined by the user interaction with the videos. Alternatively, or additionally, administrators may be permitted to select a panel of judge experts for rating the videos submitted for the competition to prevent at least the perception of manipulation based on popularity or fraud.

A financial disbursement subsystem may be configured to automatically identify the appropriate parties and payment due (e.g., portion of revenue, prize money) to disburse to the content generator(s).

A variety of privacy controls may be implemented. For example, each content generator may be permitted to select whether or not they wish to receive compensation for their videos. Individual competition hosts may be able to limit participants. Individual users may be able to limit who views their content or activity within the platform.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 7A is a plan view of an exemplary highlight reel module watch page for the platform;

FIG. 7B is a plan view of an exemplary categories module watch page for the platform;

FIG. 7C is a plan view of an exemplary challenges module watch page for the platform;

FIG. 8A is a plan view of an exemplary recommended videos module watch page for the platform;

FIG. 8B is another plan view of the exemplary recommended videos module watch page of FIG. 8A;

FIG. 11A is a plan view of an exemplary sport category leaderboard for the platform;

FIG. 11B is a plan view of an exemplary tag leaderboard for the platform;

FIG. 11C is a plan view of an exemplary location leaderboard watch page for the platform;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein, but are to include deviations in shapes that result, for example, from manufacturing.

Figure 1:
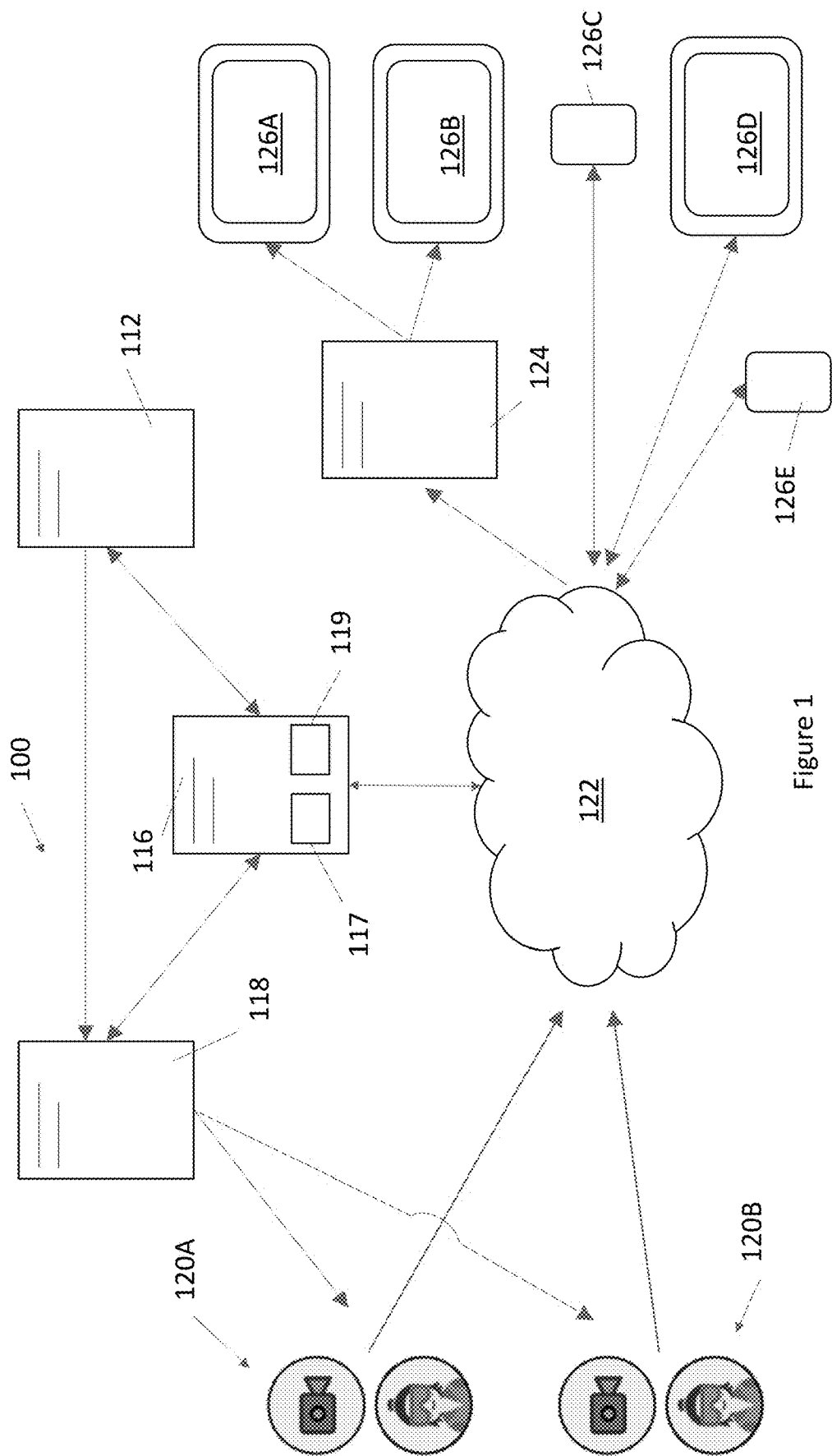
FIG. 1 is a simplified plan view of an exemplary system for providing a platform facilitating digital competition environment with user generated video content streaming on-demand.

FIG. 1 illustrates an exemplary system for facilitating digital competition and providing user generated video content streaming on-demand 100 (hereinafter also the "system"). The system 100 may comprise one or more server(s) 116. The servers 116 may be configured to host one or more websites, applications, combinations thereof, or the like forming a content platform 16 (hereinafter also the "platform").

Figure 2A:
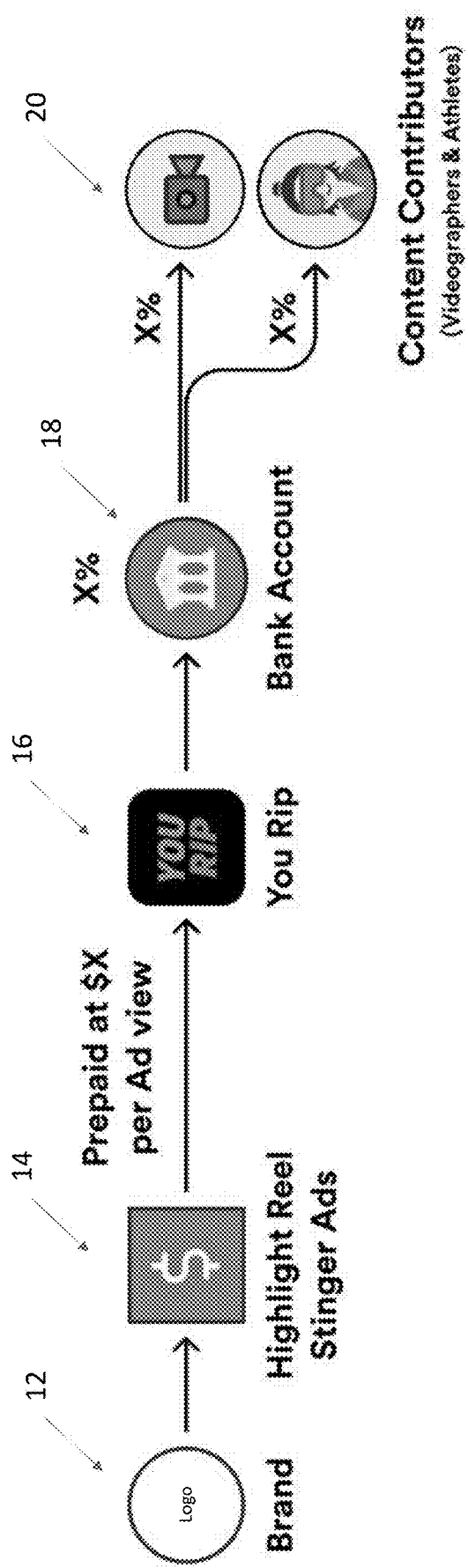
FIG. 2A is a simplified plan view of an exemplary process for operating the system of FIG. 1.

Referring additionally to FIG. 2A, brands 12, which may include entities, individuals, or the like, may elect to purchase advertising space provided within highlight reels 132 generated by the platform 16. The highlight reels 132 may comprise compilations of user uploaded content 128, such as video clips, with advertising space(s) provided therein as generally indicated at item 14. The brand 12 may purchase such advertising space(s) for a fee. The compensation may be transferred between various financial institutions 18. For example, the compensation for the purchase of the advertising space may be transferred from the brand 12 to the platform 16 provider, owner, operator, or the like, and a percentage or set amount of such revenue may be transferred to each content contributors 20 whose content is used in the corresponding highlight reel 132 containing the purchased advertising spaces. The compensation rate for the content contributors 20 may be set by way of user agreements, in exemplary embodiments. The content contributors 20 may include athletes, videographers, producers, combinations thereof, or the like.

The onboarding process of new users 26 to the platform 16 may include electronic acceptance of one or more electronic user agreements. The electronic user agreement(s) may include one or more assignments of uploaded content 128 to the platform 16 to the owners, operators, and/or affiliates of the platform 16. The electronic user agreement(s) may include a percentage or other compensation to be provided to the content contributors 20 for use of assigned and/or uploaded content 128. The electronic user agreement(s) may include some or all other terms consistent with achieving the functionality of the platform 16 as shown and/or described herein.

Figure 2B:
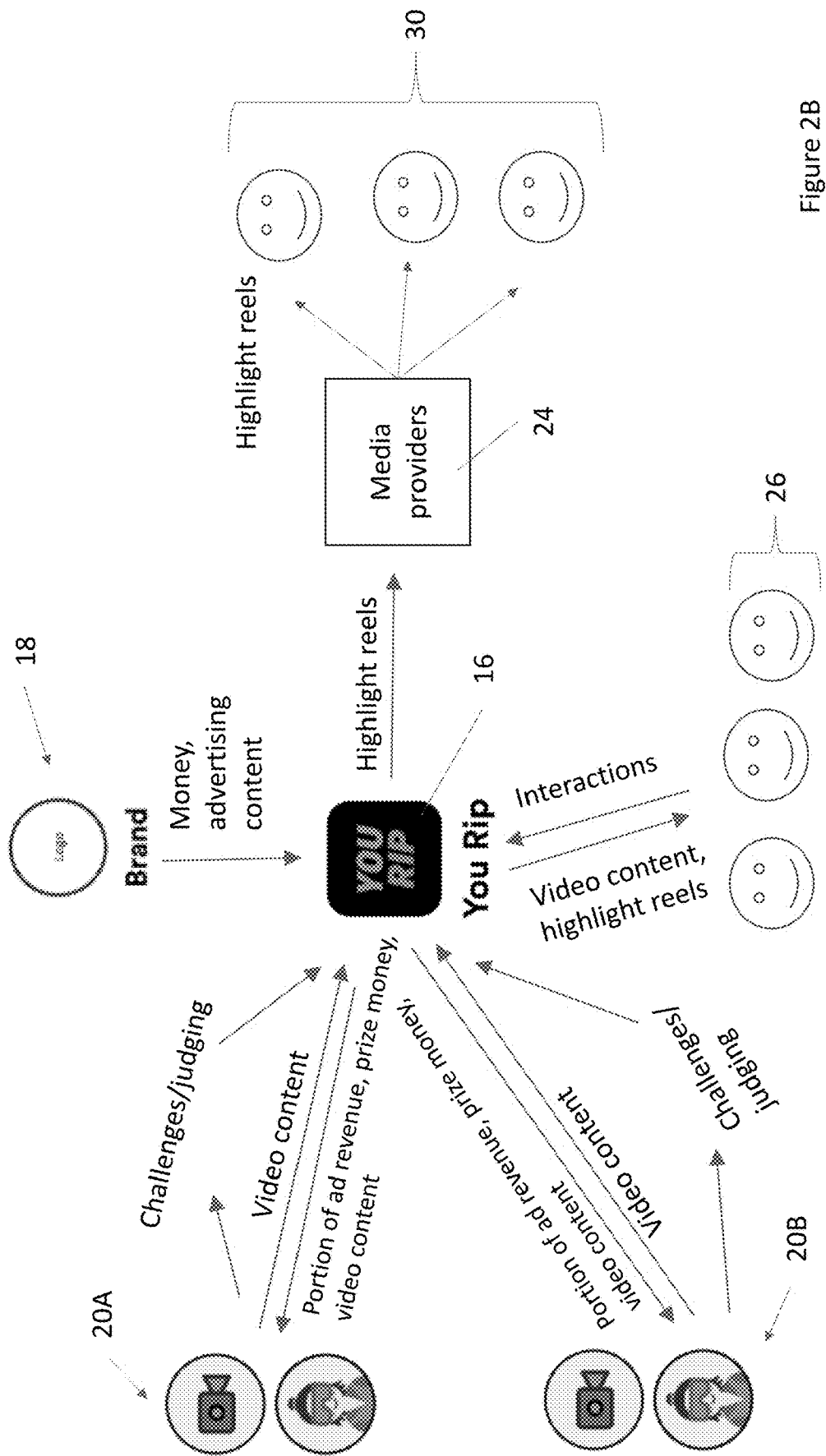
FIG. 2B is a simplified plan view of another exemplary process for operating the system of FIG. 1.

Referring additionally to FIG. 2B, alternatively, or additionally, revenue may be generated by the sale of the highlight reels 132, with or without advertising space inserted.

Some or all of the content contributors 20 may each be associated with one or more personal electronic devices 120. The personal electronic devices 120 may comprise computers, smartphones, tablets, smart cameras, combinations thereof, or the like. Each of the content contributors 20 may upload one or more videos or other content 128 taken from the personal electronic devices 120 or other videography, photography, and/or audio recording equipment items to one or more servers 116, such as by way of the platform 16. Such uploading may be accomplished by way of one or more networks 122, such as by wired and/or wireless connection between the devices 120 and the server(s) 116. The network(s) 122 may comprise one or more internets, intranets, cellular networks, combinations thereof, or the like.

Figure 3A:
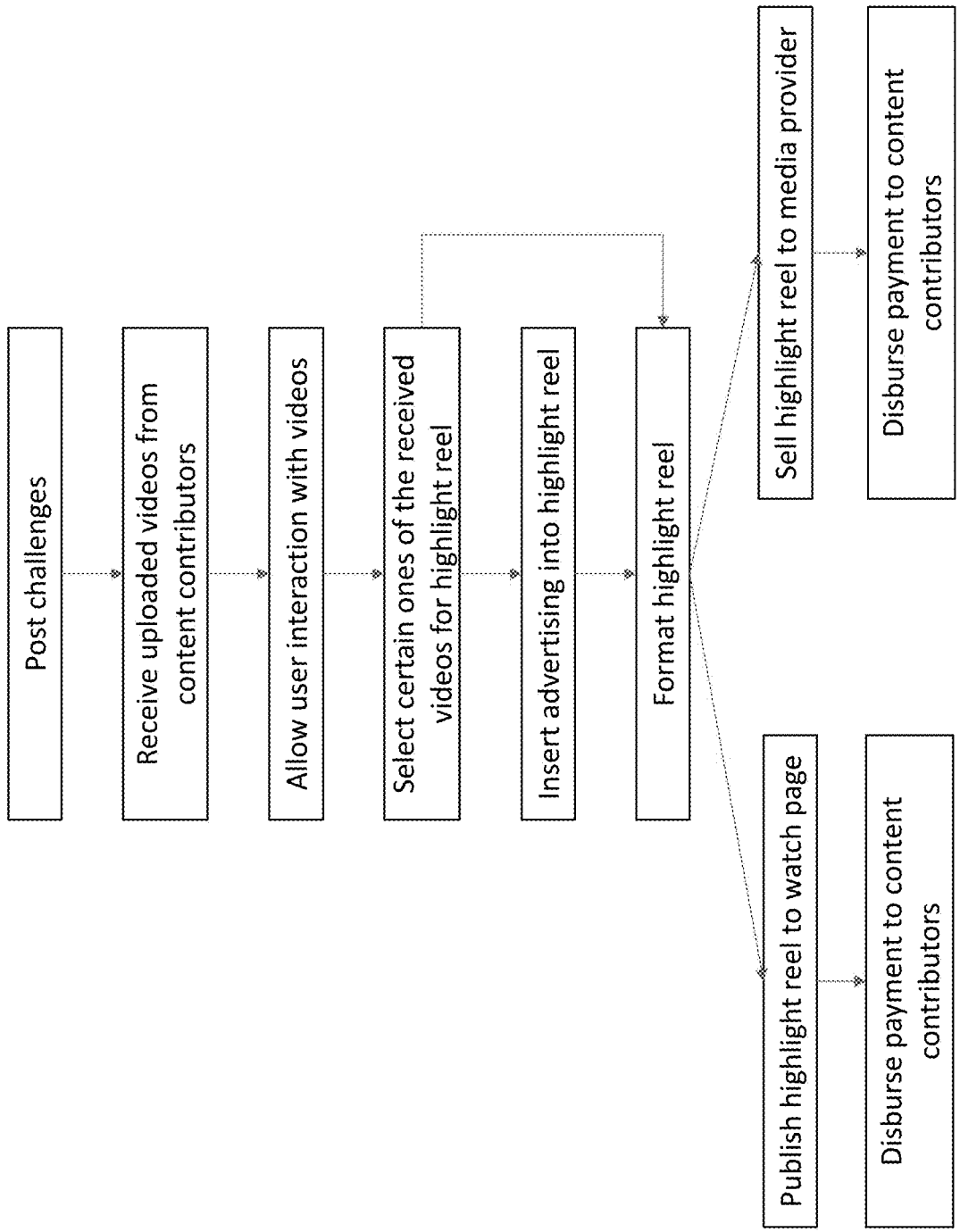
FIG. 3A is a flow chart with exemplary logic for creating highlight reels with the system of FIG. 1.
Figure 3B:
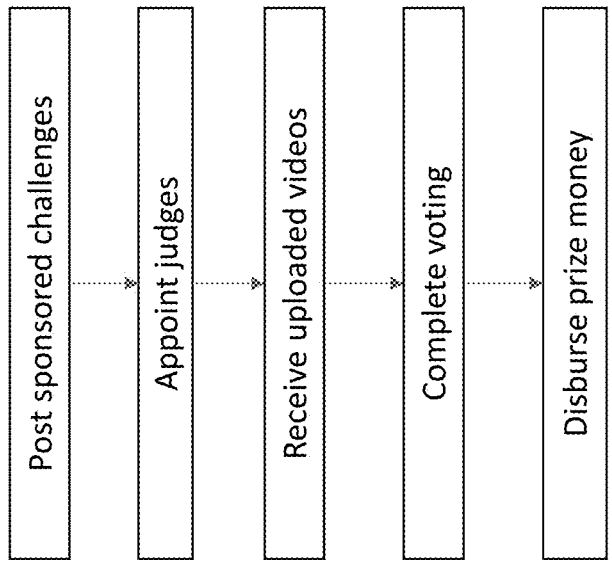
FIG. 3B is a flow chart with other exemplary logic hosting sponsored challenges with the system of FIG. 1.

As further explained herein, particularly with regard to at least FIGS. 3A and 3B, content 128 may be uploaded responsive to, or otherwise in association with, one or more challenges 134. The challenge 134 process may incentivize content contributors 20 to upload the best available content and/or hone their skill and attempts before uploading, such as to give them the best chance of success (e.g., winning competitions, prize money, etc.), exposure, and/or monetization of their content 128. Furthermore, the challenge 134 process may result in identification of the more favored content 128, such as, but not limited to, by user interaction in accordance with at least FIG. 5. Alternatively, or additionally, such identification of more favored content 128 may be achieved by judging and/or scoring by one or more appointed judging user 26.

The platform 16 may be configured to generate and publish the content 128 and/or highlight reels 132 containing at least some of the uploaded content 128 as further shown and/or described herein. The server(s) 116 may be in electronic communication with one or more advertising systems 112. The advertising system(s) 112 may each be operated, directly or indirectly, by the brand(s) 12. The advertising system(s) 112 may be configured to facilitate purchase of advertising space on the highlight reels 132 and/or provide advertising content 130 for such purchased advertising space as further described herein. The server(s) 116 may be configured to communicate proof of play information to the advertising system(s) 112 when highlight reels 132 containing the advertising content 130 are published.

The advertising system(s) 112 may be configured to, directly or indirectly, transfer funds for the purchased advertising space to one or more financial systems 118. Each of the financial system(s) 118 may be operated by one or more of the financial institutions 18. The financial system(s) 118 may be configured to receive funds for the purchased advertising space. The financial system(s) 118 may be configured to automatically disburse a portion of the received funds to the owner, operator, etc. of the platform 16 or one or more financial institutions 18 associated therewith. The financial system(s) 118 may be configured to automatically disburse a portion of the received funds to the content contributor(s) 20 or one or more financial institutions 18 associated with the content contributor(s) 20. The amount distributed to the content contributor(s) 20 may be specified in one or more user agreements, such as between the owner, operator, etc. of the platform 16 and the content contributor(s) 20 (which may be individuals of entities).

The financial system(s) 118 and/or the server(s) 116 may be configured to automatically identify the content contributor(s) 20 associated with video clips in highlight reels 132 for which revenue is generated and an amount of revenue owed to each such content contributor(s) 20 and disburse payment appropriately. As further explained herein, this may include a portion of advertising revenue and/or prize money, to name some non-limiting examples.

In exemplary embodiments, without limitation, the financial system(s) 118 and/or the server(s) 116 may comprise one or more databases of content contributor(s) 20 and agreed upon terms for compensation of used content 128 (e.g., a percentage or amount for each video 128 used in a monetized highlight reel 132). The financial system(s) 118 and/or the server(s) 116 may comprise data indicating the content 128 used in each monetized highlight reel 132, revenue generated for each monetized highlight reel 132, and may be configured to automatically calculate and disburse payment according to such terms based on the revenue derived from the monetized highlight reel 132. The financial system(s) 118 and/or the server(s) 116 may be configured to calculate and determine such information on a periodic basis, such as, but not limited to, weekly, bi-weekly, monthly, quarterly, annually, etc.

Electronic communication between the server(s) 116, the financial system(s) 118, and/or the advertising system(s) 112 may be made by way of the one or more networks 122, including various wired and/or wireless connections.

One or more personal viewing devices 126C, 126D, 126E may be each associated with one or more users 26 of the platform 16. Users 26 may include, for example, without limitation, content contributors 20, administrative credentialed users, passive viewers 30, combinations thereof, or the like. The personal viewing devices 126C, 126D, 126E may comprise televisions, smartphones, electronic displays, tablets, personal computers, smart TV devices, combinations thereof, or the like. The personal viewing devices 126C, 126D, 126E may be configured to operate the platform 16, such as by way of internet browser and/or installed application to permit the users 26 to view and/or interact with the platform 16, including various videos 128 provided at the platform 16. Such operations on the platform 16 may be limited by credentialed level of aces by the users 26.

Metadata may be gathered from one or more of the personal viewing devices 126C, 126D, 126E regarding content 128 accessed by users 26 and/or other user 26 activity on the platform 16. The metadata, in exemplary embodiments, may be sold to third parties, such as in a non-individually identifying manner. In exemplary embodiments, the platform 16 may be configured to provide a percentage or amount of revenue generated by such sales to the users 26 whose metadata is included in the sales. This may be accomplished by way of the financial system(s) 118 in exemplary embodiments. Terms regarding the metadata, including, but not limited to, consent to such gathering, use, sales, and/or the amount or percentage provided to the users 26 may be provided in the electronic user agreement in exemplary embodiments.

Passive viewers 30 may be associated with personal viewing devices 126A, 126B, which may comprise televisions, smartphones, electronic displays, tablets, personal computers, smart TV devices, combinations thereof, or the like. The personal viewing devices 126A, 126B may be configured to facilitate non-interactive viewing of the content 128. For example, the platform 16 may be configured to generate highlight reels 132 for sale to media providers 24. Purchased or otherwise obtained highlight reels 132 may be distributed to the passive viewers 30 by one or more media systems 124 associated with the media providers 24. The media systems 124 may, for example, without limitation, be configured to broadcast the highlight reels 132, such as by way of network television, to one or more personal viewing devices 126A, 126B associated with the passive viewers 30. Viewership information may be gathered from the media system(s) 124.

Referring additionally to FIG. 3A, content 128 provided by the content generators 20 to the platform 16 may initially be uploaded in response to posted challenges 134. Challenges 134 may be posted on the platform 16, such as by users 26 having administrator credentials. The challenges 134, for example, without limitation, may request content showing an athlete content generator 20 performing a certain move, trick, maneuver, or the like, participating in a particular sport, performing at a certain location, event, course, or the like, combinations thereof, or the like. The challenges 134 may be associated with one or more tags 152, such as, but not limited to, topic, sport, athlete, videographer, location, brand, sponsor, combinations thereof, or the like.

As uploaded content 128 is received, the platform 16 may be configured to automatically associate uploaded content 128 with one or more tags 152. The tags 152 may be set by the content generators 20, and/or may be automatically assigned. For example, without limitation, where the content 128 is uploaded in response to a particular challenge 134, the tags 152 associated with the particular challenge 134 may be automatically assigned to uploaded responsive content 128.

Content 128 uploaded in response to such challenges 134 may initially be posted to one or more watch pages by associated tag 152. The watch pages may be associated with challenges 134 and/or tags 152 (e.g., category, sport, location, etc.).

In exemplary embodiments, tags 152 may be provided as hashtags, metadata, or other coding. Tags 152 may be automatically assigned using image recognition software, audio recognition software, existing metadata or other embedded information (e.g., geotags, capturing device information, identifying information, image type, image quality, combinations thereof, or the like), combinations thereof, or the like.

For at least a period of time, interactions by the users 26 with the content 128 may be recorded. These interactions may include, for example, without limitation, sharing the content 128, rating the content 128, and/or viewing the content 128. These interactions may be used to select which content 128 makes it into certain highlight reels 132 as further described herein.

Video clips 128 uploaded may be formatted by the server(s) 116. In exemplary embodiments, video clips 128 may be automatically oriented for horizontal viewing, may be configured for one or more particular aspect ratios, may be formatted for high definition (e.g., 1080p or higher), may be formatted for progressive scan mode, combinations thereof, or the like. Alternatively, or additionally, video clips 128 may be automatically enhanced or otherwise adjusted, such as for brightness, color contrast, saturation, combinations thereof, or the like. These viewing characteristics may be particularly important to media providers and/or may provide for an enhanced viewing experience.

Figure 4A:
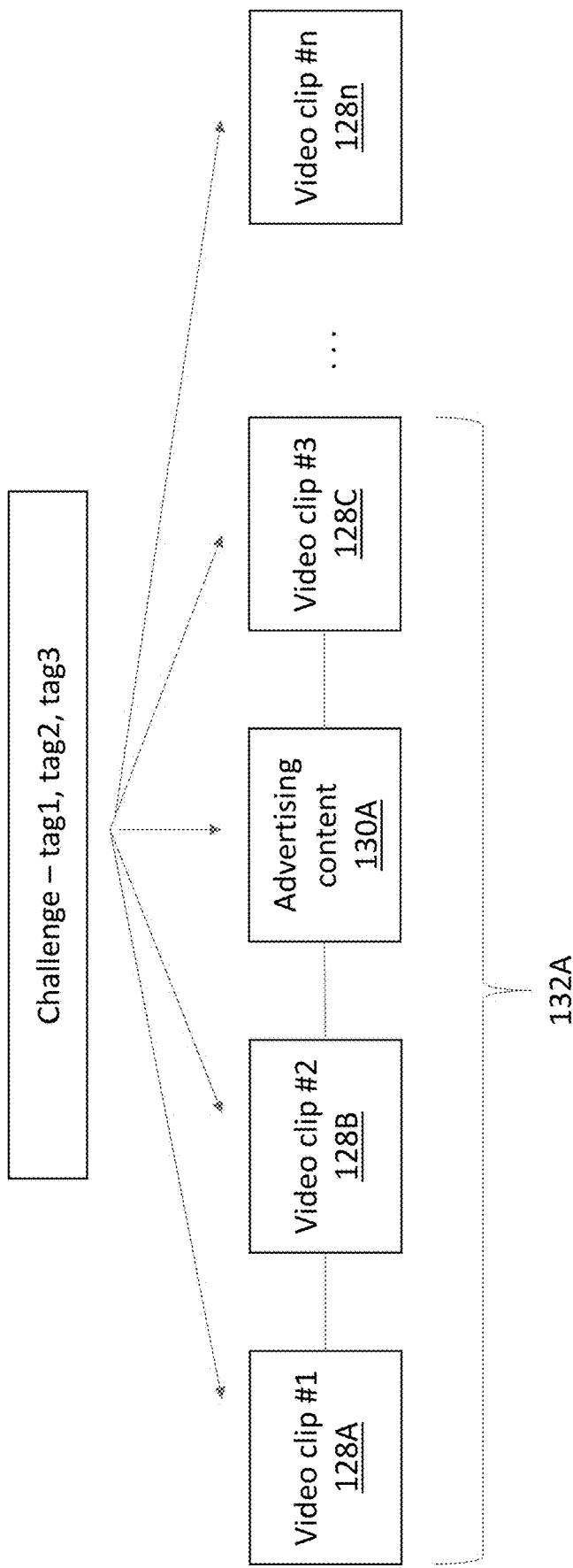
FIG. 4A is a simplified plan view for creating the highlight reels of FIG. 3A with advertising content.
Figure 4B:
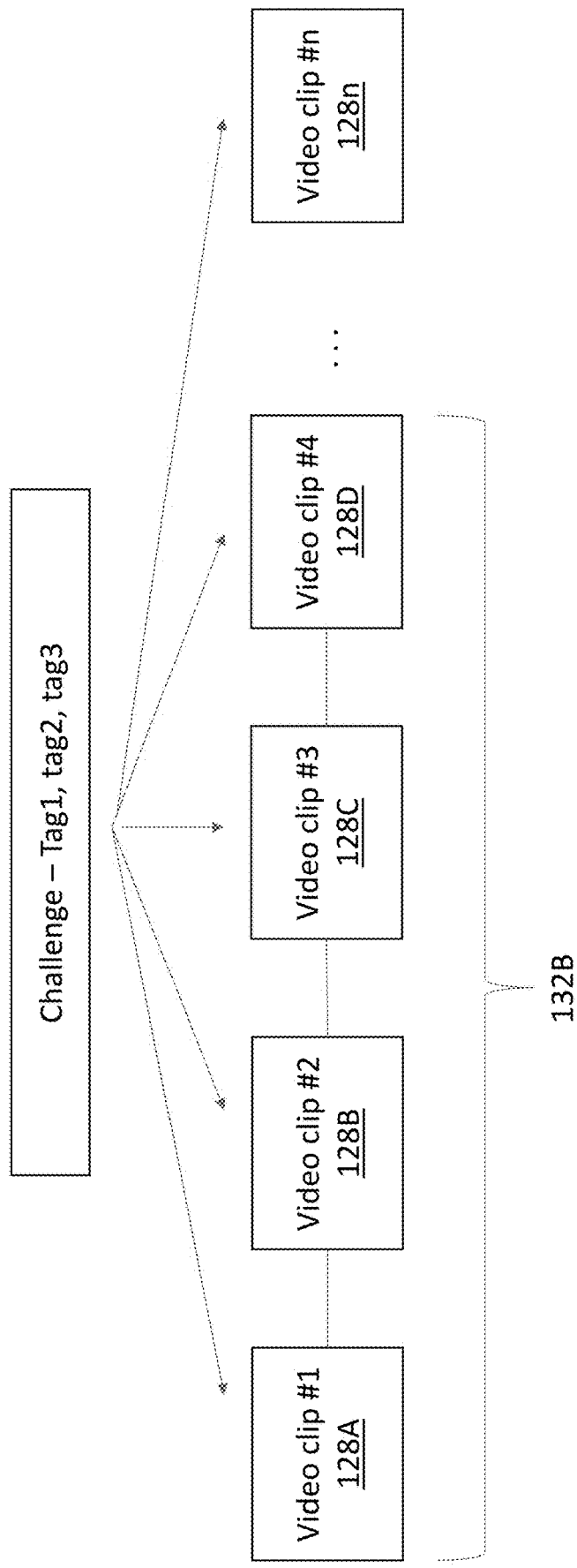
FIG. 4B is a simplified plan view for creating the highlight reels of FIG. 3A without advertising content.

Referring additionally to FIG. 4A and FIG. 4B, highlight reels 132 may be automatically generated by the platform 16 with selected video clips 128. The highlight reels 132 may include advertising space for advertising content 130 (e.g., FIG. 4A) or not (e.g., FIG. 4B). The highlight reels 132 may comprise multiple video clips 128 stitched together to create a continuous stream. Where advertising space is made available, it may be inserted every 3-4 or so video clips 128. However, any number of advertising spaces may be made available between any number of clips 128 at any interval. Any number of highlight reels 132 may be created. In exemplary embodiments, highlight reels 132 may be created by challenge 134, tag(s), combinations thereof, or the like. In this fashion, highlight reels 132 with content specific to a topic, challenge, or the like may be generated by the platform 16, which may be particularly desirable for media providers 24 who may need footage of a particular sport, location, trick, athlete, videographer, combinations thereof, or the like.

Multiple highlight reels 132 and/or highlight reels 132 comprising any number of video clips 128 and/or advertising content 130 may be created. In this manner, an essentially endless viewing experience may be provided.

The completed highlight reel 132 may be published by the platform 16. These highlight reels 132 may be made available on one or more watch pages for users 26 of the platform 16 and/or to media providers 24 for broadcast to passive viewers 30. In exemplary embodiments, highlight reels 132, without inserted advertising, may be made available to media providers 24 for sale, such as so they may insert their own advertising as desired before broadcasting to passive viewers 30, and the same or different highlight reels 132 with advertising may be published on the watch pages of the platform 16 for the users 26 to generate revenue. However, in other exemplary embodiments, highlight reels 132 with advertising content 130 may be sold to media providers 24 to generate additional revenue for the expanded viewership of the advertising content 130.

Notification of the advertising content 130 being published and/or viewed within the platform 16 may be automatically provided to the advertising system(s) 112 upon such publication and/or viewing. The content contributor(s) 20 associated with the video clips 128 in a published and/or viewed highlight reel 132 may be automatically identified and any share of payment due under the user agreements may be disbursed by the financial system 118. Such payment may be due to advertising content 130 viewed by users 26 of the platform 16 and/or by sale of highlight reels 132 to the media providers 24.

Referring additionally to FIG. 3B, some challenges 134 may be sponsored. Sponsored challenges 134 may be associated with one or more of the brands 12. In exemplary embodiments, only users 26 associated with administrator credentials may be able to create sponsored challenges 134, though such is not necessarily required. A profile for one or more brands 12 may be associated with the sponsored challenge 134.

Sponsored challenges 134 may be associated with prizes, which may be monetary in nature. Prizes may be awarded based on ranked positions, or various criteria specified within the challenge 134.

Certain users 26 may be assigned as judges for the sponsored challenges 134 by the challenge host, which may be a user 26 with administrator credentials for example. Content 128 may be submitted by the content generators 20 to the challenge 134 during a submission window. Content 128 may be ranked or otherwise judged by the appointment judges. Prizes may be awarded and distributed, such as by way of the financial systems 118 according to judged results.

The platform 16 hosted by the server(s) 116 may be configured to automatically award certain rewards to content generators 20 based on various criteria, such as, but not limited to, most shared, most viewed, or the like video clips 128. Where the rewards are monetary in nature, the server(s) 116 may be configured to automatically identify and provide such awards by way of the financial system(s) 112.

The platform 16 hosted by the server(s) 116 may be configured to permit control over voting criteria for challenges 134. For example, without limitation, video clips 128 may be voted based on a 1/10 ranking, a star rating, combinations thereof, or the like. However, voting may be based on specific criteria (e.g., skill, presentation, athlete performance, videographer performance, etc.) or may be tied to only a select number of users 26 (e.g., experts in the sport). This may help to eliminate potentially fraudulent or otherwise manipulated voting.

Highlight reels 132 may be generated from sponsored challenges 134, or any other challenges 134.

The platform 16 hosted by the server(s) 116 may be configured to permit certain controls by users 26 over the videos 128 and/or highlight reels 132. For example, users 26 who host the challenges 134, such as, but not limited to, accounts associated with sponsoring brands 12 of sponsored challenges 134, may be permitted to select which, or which type of, content generators 20 may participate in the challenges 134, which users 26 can view the highlight reels 132 (e.g., public or private group, and may select membership to the group), and which users 26 can interact with the highlight reels 132 (e.g., by allowing them into the group, or by individual user).

The platform 16 hosted by the server(s) 116 may be configured to permit certain controls by the content generator(s) 20 over their uploaded video clips 128. For example, without limitation, the content generator(s) 20 may be able to select which challenges 134 and/or tags 152 their videos 128 are associated with. In this manner, the content generator(s) 20 may only associate their content with brands 12 of their choosing. The content generator(s) 20 may be able to select monetization or non-monetization of their videos 128.

The platform 16 hosted by the server(s) 116 may be configured to permit certain controls by the users 26 who are not content generators. For example, without limitation, the users 26 who are not content generators may be able to control which other users 26 see their activity on the platform 16.

In exemplary embodiments, the platform 16 hosted by the server(s) 116 may be configured to assign credentials to various users 26 of the platform 16. For example, some users 26 may be given viewer credentials. Such credentials may be assigned to fans or other content consumers, for example. Viewers may be given the ability to view videos 128 and/or highlight reels 132, rate at least certain videos 128 and/or highlight reels 132, post comments on at least certain videos 128, message other users 26, combinations thereof, or the like. Other users 26 may be given content generator credentials. Such credentials may be assigned to content generators 20, for example.

Content generators 20 may be given the same ability as viewers plus the ability to upload videos 128 and/or participate in at least some challenges 134. Other users 26 may be given administrative credentials.

Administrators may be given the ability to create challenges 134, and control which content generators 20 may participate in such challenges. Administrators may be given the ability to select which users 26 may rate videos within a challenge 134. This may be particularly important as administrators may be given the power to dole out rating or voting ability to a select number of user 26 accounts associated with a panel of recognized judges or experts in the area, for example, without limitation. This may add credibility to the challenges 134 and prevent the challenges 134 from turning into, or being perceived as turning into, popularity contests and/or help ensure that certain, specific rating or voting criteria is followed, for example. In exemplary embodiments, the platform 16 hosted by the server(s) 116 may be configured to only allow the users 26 associated with profile appointed as a judge for a given challenge 134 to rate or otherwise vote on video clips 128 submitted for that challenge 134. To be clear, other challenges 134 may allow all users 26 to vote, select groups of users 26 to vote, no user to vote, combinations thereof, or the like. Such criteria may be specific to each challenge 134 as assigned by an administrative user, for example. Administrative users 26 may also have the abilities of viewers and/or content generators 20.

Administrative credentialed users 26 may have the ability to manually create custom highlight reels 132 and/or edit video clips 128, such as to limit them to particular portions thereof. This may include, for example, without limitation, manual video 128 selection or manual selection of criteria for selecting clips 128 (e.g., popularity, length, associated category, tag, or the like). Administrative credentialed users 26 may have the ability to push certain highlight reels 132 and/or video clips 128 to watch pages of some or all other users 26. In this manner, certain highlight reels 132 and/or video clips 128 may be promoted, such as for a fee, a portion which may be shared with the content generators 20 in exemplary embodiments.

The platform 16 may be configured to permit downloading of clips 128 and/or highlight reels 132 by some or all users 26. The platform 16 may be configured to automatically apply a watermark to one or more images of each clip 128 in the downloaded highlight reel 132 or clips 128 prior to download with identifying information for the content generator 20 and/or platform 16. This may help to prevent unapproved distribution.

Figure 5:
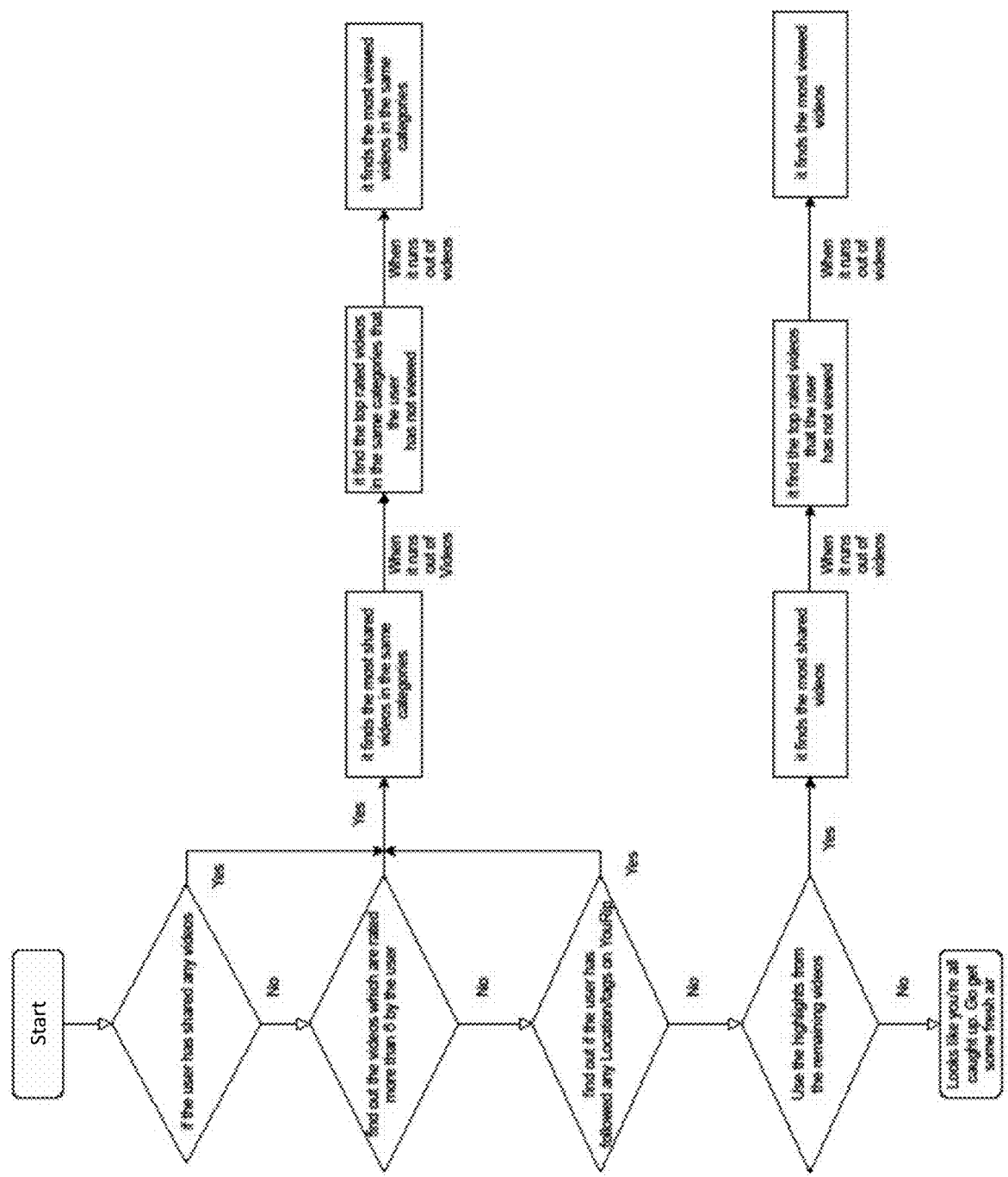
FIG. 5 is a flow chart with exemplary logic for selecting video clips for the highlight reels of FIG. 3A.

FIG. 5 provides exemplary logic for selecting content 128 for inclusion in highlight reels 132. The platform 16 may comprise, or be associated with, an evaluation module 117 for at least assisting with selection of content 128 for potential inclusion in highlight reels 132. The evaluation module 117 may be hosted on the same or different servers 116 as the platform 16, such as part of, or in association with, the platform 16. The platform 16 hosted by the server(s) 116 may be configured to publish content 128 after uploading for a period of time to permit interaction with the content 128 by the users 26. For example, without limitation, content 128 uploaded in response to challenges 134 may be posted at challenge pages or watch pages. In exemplary embodiments, videos 128 may require a minimum period of time and/or threshold of interaction by the users 26 before considered eligible for use in highlight reels 132. This may include, for example, without limitation, a minimum number of shares, ratings (of a predetermined threshold), views, combinations thereof, or the like.

Interaction by the users 26 may be provided and/or recorded by the platform 16 for specific moments within the content 128 and/or the highlight reels 132. In this manner, specific moments of the content 128 and/or the highlight reels 132 may be selected for use, such as in the highlight reels 132, for thumbnail viewing, for previews, combinations thereof, or the like.

Interaction by the users 26 may be tracked and updated periodically on an ongoing basis. For example, without limitation, individual videos 128 may be interacted with by users 26 of the platform 16 within watch pages generated by the platform 16. Alternatively, or additionally, individual videos 128 within highlight reels 132 may be interacted with by users 26 of the platform 16.

The platform 16, such as, but not limited to, by way of the evaluation module 117, may be configured to evaluate whether the viewer has shared any videos, which videos are rated a 6/10 or above (or an equivalent rating under a different system), and if the viewer has followed or otherwise indicated a preference for any particular tags 152. Videos 128 which have been shared may be given the highest priority in exemplary embodiments, reflecting the amount of interaction by the user. Videos 128 rated above a threshold (e.g., 6/10) may be given the next highest priority, reflecting the second most interaction by the user. Similar viewed clips 128 or highlight reels 132 and/or followed categories, tags 152, sports, content generators 20, combinations thereof, or the like may be given the third highest priority.

The platform 16 may be configured to select the most shared videos 128 in one or more given categories, associated with one or more given tags 152, and/or forming part of one or more given challenges 134 for inclusion with other so-ranked videos 128 to create one or more highlight reels 132. When the most-shared videos 128 are depleted, the platform 16 may be configured to find additional content 128 rated a 6/10 or above (or an equivalent rating under a different system) by other users 26, and may be configured to select videos 128 in order of ranking. When those videos 128 are depleted, the platform 16 may be configured to find additional content 128 most viewed by other users 26 associated with the same categories or tags 152 as those preferred by the given viewer, such as in order of the number of views.

Periodically, videos 128 within a highlight reel 132 or feed may be automatically shuffled by the platform 16 in a random or pseudo-random fashion.

The highlight reels 132 generated by the platform 16 may be sold to media providers 24 for broadcast to passive viewers 30 and/or published by the platform 16 at one or more watch pages for users 26 to view and interact with. The categories, tags 152, and/or challenges 134 used to generate highlight reels 132 may be selected based on media provider 24 preferences or need, brand 12 preferences or need, and/or user 26 preferences. For example, without limitation, media providers 24 may have a need for surfing related footage, so the media provider 24 may request a highlight reel 132 with videos 128 categorized as surfing and/or with specific athlete or location tags 152 which may be produced by the platform 16 for sale to the media provider 24. As another example, without limitation, a skateboarding brand 12 may wish to purchase advertising space on a highlight reel with skateboard specific content 128, so the platform 16 may be configured to create a highlight reel 132 with videos 128 categorized as skateboarding and/or with specific brand tags 152 which may be produced by the platform 16 for sale of the advertising space therein. Such criteria, related requests, bid, offers, payment, advertising content, finalized highlight reels 132, combinations thereof, or the like may be automatically and/or electronically received and/or transmitted.

Alternatively, or additionally, the highlight reels 132 generated by the platform 16 may be published at one or more watch pages for the users 26 to view. Where such highlight reels 132 comprise advertising space, revenue may be generated by its purchase and/or views of the users 26. The content 128, in individual form and/or as part of a highlight reel 132, may continue to be posted to various watch pages for interaction by the users 26, which may affect subsequent use in later produced highlight reels 132. For example, ratings, number of shares, and/or number of views associated with each piece of content 128 may change over time and the most updated data base used by the evaluation module 117 in exemplary embodiments.

In exemplary embodiments, the highlight reels 132 may be created following the closing of a period of time associated with a given challenge 134, though such is not required. The highlight reels 132 may be published to users 26 and/or viewers 30 by way of the devices 126. The highlight reels 132 may be made accessible on the platform 16 and/or via broadcast by the media system(s) 124. The highlight reels 132 may be particularly beneficial to the media systems 124 for broadcast, or individual users 26, as they may be formatted in a desirable fashion for enhanced viewing. The highlight reels 132 may be used for various applications, such as for filler clips, teasers, stock videos, background footage, combinations thereof or the like. For example, without limitation, a television network doing a story on surfing off the coast of South America may purchase a highlight reel 132 generated by the platform 16 under the categories of surfing and associated with location tags 152 in South America for use as filler or background footage. As another example, without limitation, a user 26 interested in mountain biking in Utah might view highlight reels 132 generated by the platform 16 under the categories of mountain biking and with location tags 152 of Utah. The same may be true of any number and type of categories, tags 152, or the like. A portion of the revenue obtained from sales of such highlight reels 132, and/or advertising space within such highlight reels 132, may be automatically disbursed to the content generators 20 in exemplary embodiments.

In exemplary embodiments, the advertising content 130 may be included in highlight reels 132 published at the platform 16 and removed from the same or different highlight reels 134 sold to media systems 124 so that they may introduce their own advertising content as desired, though such is not required.

Figure 6:
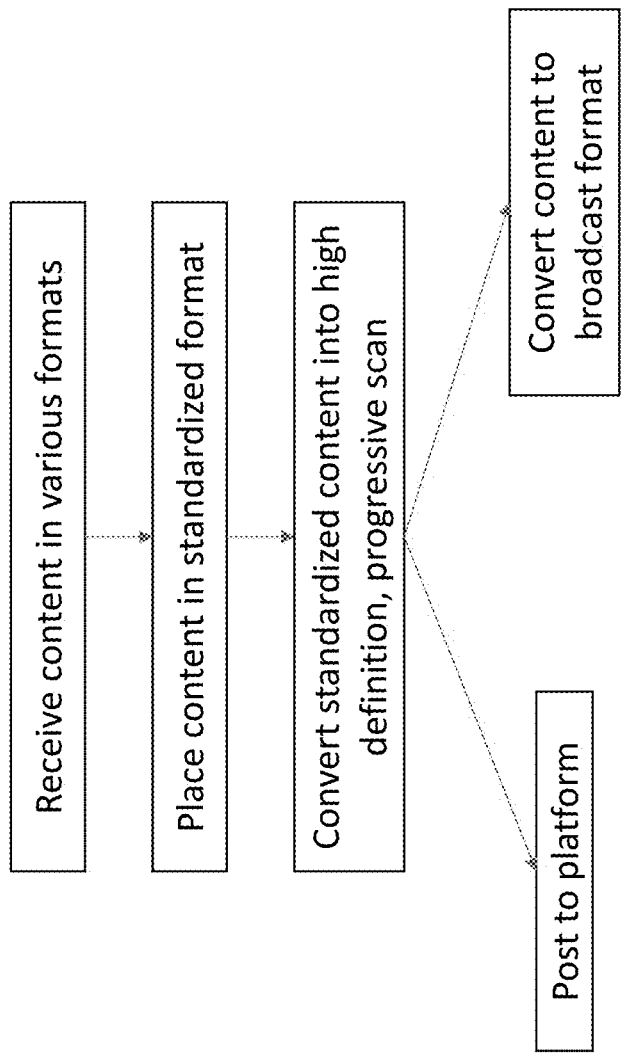
FIG. 6 is a flow chart with exemplary logic for formatting content and advertising for use on the platform and other publication.

FIG. 6 provides exemplary logic for converting content 128 and/or advertising content 130 for use with the platform 16, the media systems 124, and/or other publication. The platform 16 may comprise, or be associated with, a conversion module 119. The conversion module 119 may be hosted on the same or different servers 116 as the platform 16, such as part of, or in association with, the platform 16. The conversion module 119 may be configured to convert incoming content 128 from any of a number of various formats into a standardized format, such as for use with the platform 16. The personal electronic devices 120 used by content generator 20 may be different, and may be configured to produce content 128 in varying formats. For example, without limitation, the video clips, images, or other content 128 generated by, and/or uploaded from, Apple® devices such as iPhones®, GoPro® devices, devices using Android® based operating systems, digital cameras, digital video recorders, combinations thereof, or the like, may be differently formatted using protocols specific to the devices or the type of content 128 generated. The content 128 may be accepted at the servers 116 of the platform 16 in the various formats in exemplary embodiments and converted into one or more standardized format using one or more standardized protocols. Such conversions may be performed at the conversion module 119 which may comprise one or more standardization protocol related software routines.

As needed, the content 128, particularly once standardized, may be converted into one or more desirable formats, such as but not limited to, high definition (e.g., 720, 1080, 4K, HDR10, Dolby Vision®, Dolby Atmos®, combination thereof, or the like), progressive scan, horizontal viewing, vertical viewing, certain aspect ratios, automatic adjustment for brightness, color saturation, sharpness, automatic application of one or more filters, combinations thereof, or the like. These formats may be desired by media providers 24, content contributors 20, users 26 and/or passive viewers 30. Such conversions may be performed at the conversion module 119 which may comprise one or more up-conversion, formatting, filtering, adjustment, or other content editing software routines.

The conversion module 119 may alternatively or additionally be configured to convert advertising content 130, such as provided by the advertising systems 112. Similar to the content 128, the advertising content 130 may be provided in various formats, such as due to devices used by the advertising systems 112, user preferences, type of advertising content 130, devices used to capture advertising content 130, combinations thereof, or the like. The conversion module 119 may be configured to convert such content 130 into a standardized format for use with the platform 16 and/or into one or more desirable formats (e.g., high definition, progressive scan, horizontal viewing, etc.). The conversion module 119 may, alternatively or additionally, be configured to convert such advertising content 130 for use with the viewer devices 126 and/or media systems 124.

The platform 16 may be configured to post content 128 and/or advertising content 130 in the standardized and/or desirable formats for viewing. Such posting may be in any manner shown and/or described herein, such as by itself and/or as part of one or more highlight reels 132.

The conversion module 119 may be configured to further convert content 128 and/or advertising content 130 as needed into formats accepted or preferred by media provider systems 124, such as coded for broadcast over the internet, live streaming, satellite, combinations thereof, or the like.

The conversion module 119 may be configured to convert the content 128 and/or advertising content 130 from and/or into any number or type of formats specific any number and type of systems or devices utilized by content contributors 20, users 26, passive viewers 30, media providers 24, combinations thereof, or the like, such as but not limited to the personal electronic devices 120, media systems 124, and/or viewer devices 126. Such conversions, standardization or otherwise, may be performed automatically by the conversion module 119. For example, without limitation, the conversion module 119 may comprise software configured to detect the format of uploaded and/or selected content 128 and/or advertising content 130, and automatically standardize and/or otherwise covert the content 128 and/or advertising content 130 as needed for viewing, transmission, posting, and/or further publication. The conversion module 119 may comprise, or be configured to, utilize one or more encoders. The encoders may be configured to format the content 128 and/or highlight reels 128 based on the device utilized and/or bandwidth, such as but not limited to, display size, definition, compression, up-conversion, down conversion, combinations thereof, or the like. Such formatting may be selected within minimum parameters to ensure a positive user experience, but to minimize load times, by way of non-limiting example. Such formatting may occur automatically.

The conversion module 119 may be configured to automatically format all of the content 128 in a given one of the highlight reels 132, all of the content 128 uploaded as part of a given challenge 134, combinations thereof, or the like to provide the same, or relatively consistent (e.g., within 5 or 10% of one another or a benchmark setting), viewing experience across such content 128. For example, without limitation, brightness, contrast, hue, saturation, exposure, color curves, filter application, combinations thereof, or the like, may be applied across all of the content 128 in a given one of the highlight reels 132 or uploaded as part of a given one of the challenges 134. This may provide the same or similar quality experience in an effort to evoke a particular experience or a visceral or emotive quality. The settings or benchmarks applied by the conversion module 119 may be the same or different across the various highlight reels 132 and/or challenges 134. The settings or benchmarks applied by the conversion module 119 may be the same or different for some or all of the highlight reels 132 and/or challenges 134.

FIG. 7A through FIG. 11C illustrate various exemplary pages generated by the platform 16 when operated by users 26. While shown with regard to an application installed on a smartphone, those of ordinary skill in the art will appreciate that the same or similar content and/or features may be provided at other type or kinds of viewer devices 126, such as in an equivalent website form.

Navigational controls 156 may be provided at some or all pages of the platform 16. Navigational controls 156 may be the same or different and may include, by way of non-limiting example, shortcuts for accessing a record feature, leaderboards 154, one or more watch pages, challenge pages 134, and/or user 26 profile information. Other navigation may be made by selection (e.g., touch, by mouse, keystroke, etc.), gestures (e.g., tapping, press and hold, pinch, using multiple fingers, swiping, etc.), combinations thereof, or the like.

FIG. 7A illustrates an exemplary highlight reel 132 with a given video clip 128 of the larger highlight reel 132 displayed. As demonstrated with particular regard to FIG. 7B, highlight reels 132 and/or video clips 128 may be organized by categories or tags 152. As demonstrated with particular regard to FIG. 7B, highlight reels 132 and/or video clips 128 may be associated with challenges 134.

As demonstrated with particular regard to FIGS. 8A-8B, a recommended feed of videos 128 and/or highlight reels 132 watch page may be generated. Highlight reels 132 may be generated in accordance with the logic of FIG. 5, for example. Highlight reels 132 may comprise content 128 formatted in accordance with the logic of FIG. 6, for example. Alternatively, or additionally, videos 128 may be individually posted randomly, based on date received, by associated tag 152, associated challenge 134, user 26 interests, most shared, highest rated, trending, combinations thereof, or the like. Certain videos 128 and/or highlight reels 132 may be promoted in a manner which puts them into certain positions within the watch pages. Videos 128 and/or highlight reels 132 may be generated automatically based on user 26 search criteria, selections, interactions with the platform 16, combinations thereof, or the like. Watch pages may be specific to tags 152 in exemplary embodiments to create channels for specific topics such as locations, sports, athlete, videographer, hashtags, combinations thereof, or the like. A recommended channel may be generated by the platform 16 with highlight reels 132 specific to user 26 interests as demonstrated by past interactions within the platform 16, for example.

Figure 9C:
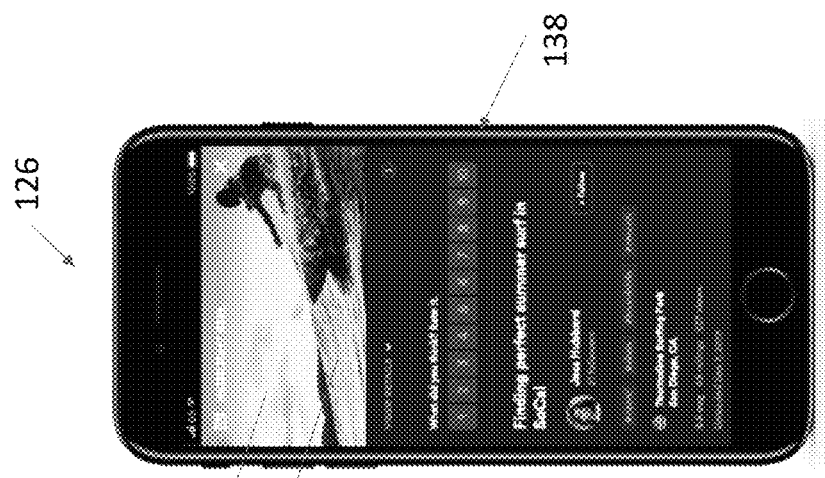
FIG. 9C is a plan view of the exemplary highlight reel video of FIG. 9A with expanded details displayed.
Figure 9B:
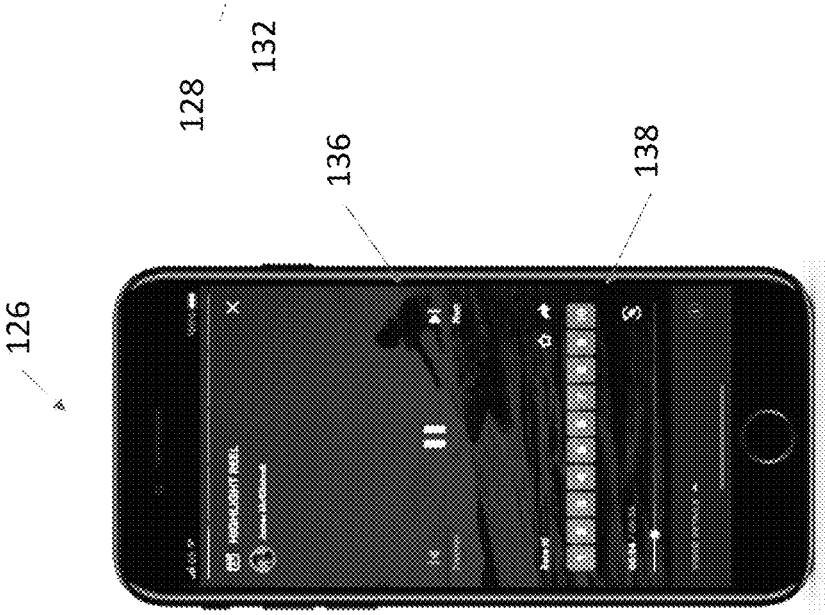
FIG. 9B is a plan view of the exemplary highlight reel video of FIG. 9A with controls displayed.
Figure 9A:
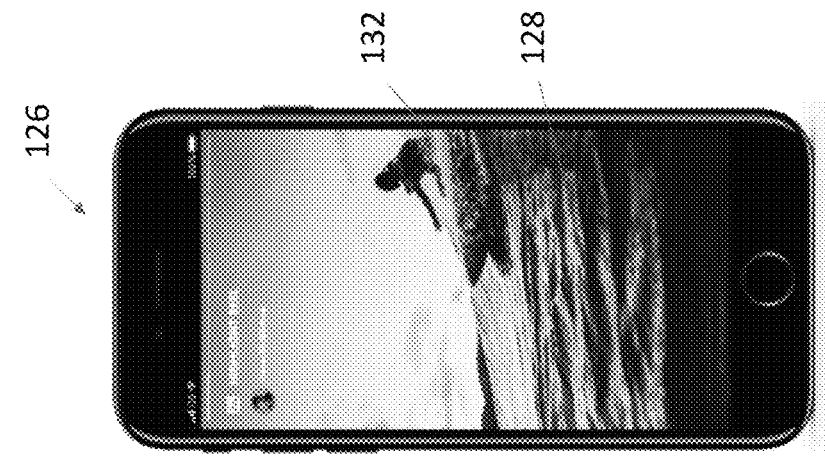
FIG. 9A is a plan view of an exemplary highlight reel video for the platform.

As demonstrated with particular regard to FIGS. 9A-9C, various details for videos 128 and/or highlight reels 132 may be displayed, such as playback controls 136 and/or rating options 138 and/or tags 152, channel information, challenges 134, content generator 20 information, or other information associated with the videos 128 and/or highlight reels 132.

Figure 10B:
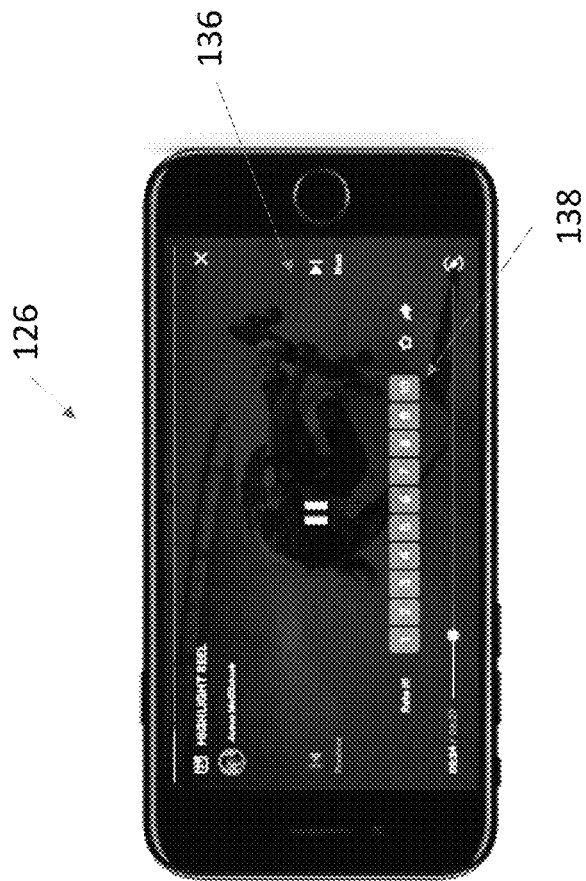
FIG. 10B is a plan view of the exemplary highlight reel video of FIG. 10A with controls displayed.
Figure 10A:
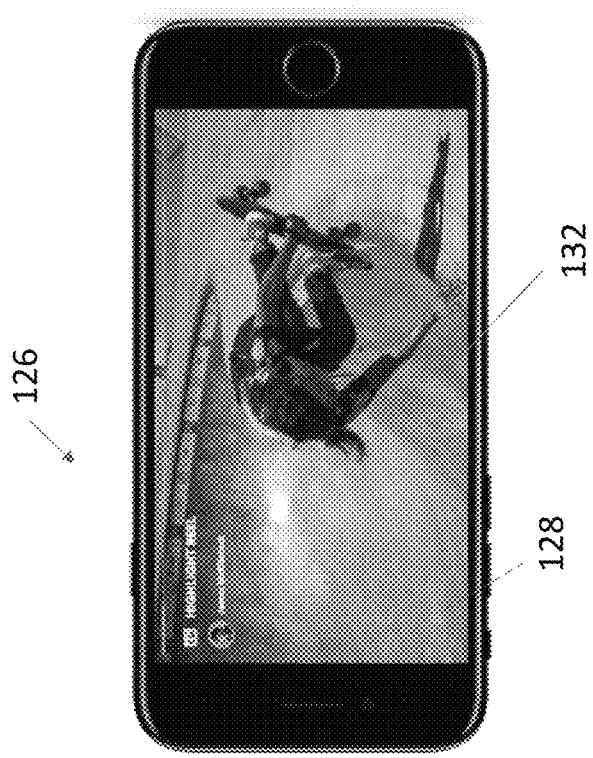
FIG. 10A is a plan view of another exemplary highlight reel video for the platform in a horizontal viewing mode.

As demonstrated with particular regard to FIGS. 10A-10C, equivalent content and/or features may be provided in vertical or horizontal orientations. The platform 16 may be configured to automatically format content 128 for portrait and/or horizontal viewing, such as in a full screen fashion, on any number of type of devices 126. Videos 128 may be automatically cropped, resized, scaled, or the like to accommodate such viewing, for example.

As demonstrated with particular regard to FIGS. 11A-11C, the website(s) and/or application(s) hosted by the server(s) 116 may be configured to generate various leaderboards 154. The leaderboards 154 may be provided in accordance with tags 152 such as, but not limited to, categories or sports (e.g., FIG. 11A), hashtags (e.g., FIG. 11B), and/or locations (e.g., FIG. 11C) to name some non-limiting examples.

The platform 16 hosted by the server(s) 116 may be configured to provide a number of features and/or operations including, but not necessarily limited to, the following.

To get started, a user 26 may join the platform 16 by creating an account. The account may be created using the user's 26 email address, social media or other account. A user may sign in using their credentials. The platform 16 may initially provide a walkthrough on how to use the platform 16. The user 26 may be able to reset their password or other login credentials if forgotten. A user 26 may further create their account by setting up a profile with information such as, but not limited to, name, profile photo, personal bio, country and/or city of residence. The profile may be saved and later edited. Users 26 may be content generators 20 (e.g., athlete or videographer) or viewers.

If the user 26 is a content generator 20, they may view the average rating of their video clips 128, number of followers, number of challenge 134 wins, and top sport category. Content generators 20 may associate one or more accounts of one or more financial institutions 18, including, but not limited to, PayPal® for receiving funds, such as, but not limited to, from advertising revenue, sponsorship payment, and challenge prize money.

If the user 26 is a content generator 20, they may view uploaded video clips 128 such as by most recent, highest average rating (top rated), those tagged in by other users 26 (which the content generator 20 may accept or reject), upload video option, view the sport, location, or hashtag leaderboards 154 that they are ranked on.

Options may be provided for the users 26 to edit various preference settings, including, but not limited to: associated email and password, account type (e.g., athlete or videographer), video preferences, music accounts (e.g., Spotify®) to add music to videos 128, preference to receive or not receive revenue (e.g., prize money, revenue sharing for advertising and/or content sales), associated accounts and/or financial institutions 18, notifications they would like to receive, and an option to delete the account.

If the user 26 is a content generator 20, platform 16 hosted by the server(s) 116 may be configured to provide various options regarding uploading and editing video clips 128. The video clips 128 may be recorded directly within the platform 16, or select their personal electronic device (e.g., from a gallery) for uploading. Options may be provided for trimming the video clips 128, adding filters or otherwise modifying the video clips 128, and/or adding music. The user 26 may be able to select a system-generated thumbnail image, or upload their own. The user 26 may be able to select an associated sport category for each video 128, such as, but not limited to: surf, skate, snow, or extreme. The user 26 may be able to add a title, location, tags 152 (e.g., hashtags 152), the athlete(s), the videographer(s), or claim credits for video for example without limitation. The user 26 may be able to select whether the video will be public or private. The user 26 may be able to publish the video clips 128 to their profile. This may also make the video clips 128 discoverable throughout the platform 16. The user 26 may be able to submit the uploaded video clips 128 to one or more challenges 134, such as ones they have joined or are following.

A home screen may provide one or more watch pages for viewing videos 128 (e.g., FIGS. 7A-10B). A user 26 may view individual videos 128 and/or highlight reels 132 when first entering the platform 16. The highlight reels 132 may be generated such as described with respect to FIG. 5 on an individual user 26 basis, for example, without limitation. The user 26 may be able to view the profile of any content generator 20 they discover by watching the highlight reels 132. The user 26 may be able to browse for videos 128 and/or highlight reels 132 by category, such as, but not limited to: surf, skate, snow, extreme, popular tags 152, or top locations. The user 26 may be shown recommended challenges 134 that are active on the platform 16. The user 26 may be able to join one or more challenges 134.

The platform 16 may be configured to display videos clips 128 and/or highlight reels 132 associated with any athletes, videographers, challenges 134, locations, tags 152, or channels that the user 26 is following and/or interested in as determined by prior interactions by the user 26 with the platform 16. The user 26 may scroll through their personalized video feed which may comprise videos clips 128 and/or highlight reels 132, which may be determined by viewing history and interests (e.g., FIG. 5 by way of non-limiting example). Upon selection of videos clips 128 and/or highlight reels 132, the user 26 may enter the associated channel with additional videos clips 128 and/or highlight reels 132.

The user 26 may watch videos clips 128 and/or highlight reels 132 in full screen mode (portrait and landscape mode). When a video clip 128 and/or highlight reel 132 ends, the next video clip 128 and/or highlight reel 132 in the associated channel may be automatically played, creating continuity and a virtually endless stream of content. The platform 16 may be configured to permit rating of video clips 128 and/or highlight reels 132, such as on a scale of 1-10 (e.g., FIGS. 9B, 10B). Users 26 may be able to save select video clips 128 and/or highlight reels 132 to their favorites. Users 26 may be able to share the video clips 128 and/or highlight reels 132. Users 26 may be able to view video details, including, but not limited to, title, contributor (athlete and/or videographer—follow options may also be provided), sport or other category, tags 152, location, rating, number of ratings, number of views, date of upload, comments, tagged athletes (with follow option), videographer (with follow option), next videos option, comment option, associated channel(s), the profile of a content creator or featured athlete, combinations thereof, or the like (e.g., FIGS. 7B-7C, 9B-9C, 10B).

The platform 16 may be configured to provide public user profiles. The users 26 (e.g., content generators 20 or viewers) may be able to view the profile of other users 26 (e.g., content generators 20 or viewers), which may include, for example, without limitation: name, profile photo, bio, and location, average rating, number of followers, number of challenge wins, and top sport category, and recently watched videos 128. The user may be able to enter a "watch" mode and play videos from another content generator's 20 channel, view the videos 128 from the athlete that won or placed in challenges 134, view the athlete's active challenges 134. The users 26 may be able to view the sport, location, or hashtag leaderboards 154 the athlete is ranked on, share the profile, report the user, block the user, make a sponsorship payment directly to the content generator 20 (by common or custom amount), send an optional message to the content generator 20, and the content generator 20 may receive notification of the sponsorship payment.

The platform 16 may be configured to permit at least certain users 26 to start or otherwise create challenges 134. The user may select a sport or other category, a challenge type (e.g., virtual or face-to-face), a name for the challenge, details, such as a description or specific judging criteria, date that scoring will close (e.g., 1-30 days), video submission deadline date (can be the same, or earlier than the date scoring will close). If the challenge 134 is a face-to-face challenge, the user may set the location, date, and time, for example where the challenge is to physically take place. The content generators 20 may be only able to submit a video 128 to a face-to-face challenge after the challenge date and time. The content generators 20 may be select competing content generators 20 to invite to the challenge 134 (the challenge creator can add competitors once the challenge has been created). The challenge creator may be able to review the challenge 134 details, start the challenge (which may post it to the platform 16 in a manner which is discoverable by others), delete a challenge prior to any video submissions, or prior to the date/time of a face-to-face challenge.

Alternatively, "virtual" challenges 134 may be created which require no specific physical location and/or meet up. Such virtual challenges 134 may include a deadline for content 128 submission. In this way the platform 16 may support competition that occurs in both the physical world and in the digital world, and/or a hybrid of both through digital voting for real world challenges 134. The platform 16 may be configured to produce what is essentially a digital archive that further merges the way that competition sport is produced, shared and consumed. The platform 16 may comprise, or be associated with, one or more databases for archiving the content 128 in exemplary embodiments.

The platform 16 may be configured to permit users 26 to compete in challenges 134. Users 26 may discover challenges 134 from the watch pages, the challenges page, shared link, by searching, or in other ways, and may open the challenge page to view details. The challenge details may include, for example. without limitation: a title, videos that have been submitted, description, challengers, video submission deadline date, scoring closes date, challenge location, date, and time (if it is a "face-to-face" challenge and not a "virtual" challenge), and list of competing content generators 20 (e.g., including their profile photo, name, and average rating with ability to view the video if they have already submitted). The content generators 20 can follow the challenges 134. The users 26 (e.g., content generators 20 and/or viewers) may be able to play submitted videos 128 and provide ratings. The content generators 20 can join the challenge 134 if it is public. The content generators 20 can submit videos 128 to the challenges 134. These may be videos 128 on their profile that have not been submitted to a challenge 134, a video recorded directly in the platform 16, or a video from their device.

The content generators 20 may be able to market their challenge 134 submission by sharing a link or their video link to other content generators 20 and/or viewers and encouraging them to rate the videos. Video 128 submissions by content generators 20 may be rated by other content consumers 20 or viewers and may be ranked comparatively to the other submissions. Content generators 20 may earn their final result based on the average rating of their video by content generators 20 and/or viewers. Content generators 20 and followers may be notified when the results of the challenge 134 are finalized. Indications of challenges won by various content generators 20 may be displayed on their profiles.

The platform 16 may be configured to permit at least select users 26 to create sponsored challenges 134. In exemplary embodiments, only users 26 associated with administrator credentials can create sponsored challenges 134, though such is not necessarily required. A profile for one or more brands 12 may be associated with the sponsored challenge 134. Brand 12 profiles may comprise, for example, without limitation: brand name and/or logo, brand description, location, videos, links to websites to promote the brand. Users 26 may be able to search, discover, and view brand profiles. Users 26 may be able to follow or share brand profiles, watch their videos, navigate to their websites, or the like.

The sponsored challenges 134 may include prize purse details such as, but not limited to, total prize purse and prizes for top ranked results positions (1st, 2nd, 3rd, etc.). The sponsored challenges 134 may be posted in a discoverable manner upon creation. Content generators 20 and viewers may be notified of the sponsored challenges 134. In exemplary embodiments, prize money may be distributed to all participating content generators 20 whose content 128 generates views as part of the sponsored challenges 134. In this manner, each participating content generators 20 may be awarded for helping to make the content 128 and/or the platform 16 more visible. Prize money may be automatically awarded to participating content generators 20 based on number of views generated, such as on an absolute or percentage basis as tracked by the platform 16. Alternatively, or additionally, prize money may be automatically awarded to participating content generators 20 based on the type of user interaction generated. For example, without limitation, sharing content 128 with others may be weighted more heavily than commenting, which may be weighted more heavily than liking, which may be weighted more heavily than viewing. Such interaction may be automatically tracked, and prizes awarded accordingly by the platform 16.

Any type or kind of user interaction may be utilized and/or tracked by the platform 16, such as but not limited to, viewing, sharing, liking, rating, commenting, flagging, tagging, highlighting, providing hashtags, coding with keywords, star rating, thumbs up/thumbs down, reaction (e.g., by emoji or otherwise), combinations thereof, or the like.

Alternatively, or additionally, such techniques may be adopted for revenue sharing from advertising content 130, highlight reel 128 generation and sales, combinations thereof, or the like.

The platform 16 may be configured to permit submission of video clips 128 to sponsored challenges 134 in a manner the same or substantially similar to other challenges 134. In exemplary embodiments, pages for sponsored challenges 134 may include total prize purse, prizes for top ranked results positions, description of how the sponsored challenge 134 will be judged, any associated panel judges and associated profiles (if available), availability of fan/viewer scoring, combinations thereof, or the like. The content generators 20 may be required to associate at least one account of at least one financial institution 18 and/or financial system 118 in order to compete in a sponsored challenge 134. The content generators 20 may join any number of sponsored challenges 134 and submit videos 128. Other users 26 (e.g., content generators 20 and/or views) may be able to rate the video clips 128 submitted. Any invited and accepted panel judges may be able to rate the video clips 128 submitted. Judge and fan/viewer ratings may be the same or differently weighted or be afforded the same or different prizes (e.g., judge favorite vs fan favorite). At the end of the scoring period, the scores of the judges and content consumers are calculated and the results are determined. The platform 16 may be configured to automatically facilitate payment of appropriate prize money winners, such as via the financial systems 118 and associated accounts of financial institutions 18.

The platform 16 may be configured to provide searching functions. Users 26 may be able to search for videos 128, tags 152, other users 26 (e.g., content generators 20), locations, or challenges 134. Users 26 may be able to navigate to the associated videos 128, channels, profiles, or challenges 134. Users 26 may be able to follow channels directly from the search results.

The platform 16 may be configured to provide leaderboards 154 (e.g., FIGS. 11A-11C). Users 26 may be able to view the top athletes for each of the primary sport categories, such as, but not limited to: surf, skate, snow, or extreme. Users 26 may be able view the top location channels and/or hashtag channels to discover interesting content.

The platform 16 may be configured to provide channels. Channels may be specific to tags 152 associated with videos 128. Videos 128 may be uploaded with associated metadata and/or tags 152, and/or such metadata and/or tags 152 may be associated with the videos 128 as they are used within the platform 16 (e.g., views, shares, ratings, etc.). Channels may be created for each tag 152, such as by primary sport, hashtag, and/or location for content generators 20 to browse based on their interest(s). The users 26 may be able to open channel pages to view all videos 128 tagged with one or more specific tags 152. For example, the users 26 may be able to open channel pages to view all videos 128 tagged to a specific location. As another example, users 26 may be able to open channel pages to view all videos 128 tagged to a specific sport category: surf, skate, snow, or extreme. The platform 16 may be configured to automatically create highlight reels 132 with the various videos 128 associated with the tags 152 of a given channel. Users 26 may be able to view the athlete leaderboard 154 for primary sport categories.

Users 26 may be able to browse channels, such as by: viewing videos 128 in that channel by most recently viewed, top rated, and associated content generator 20. Users 26 may be able to follow the top content generators 20, channels, or the like to see new videos when they are posted. Content generators 20 may be able to submit videos 128, which may be automatically and electronically associated with metadata and/or tags 152 required for the video 128 to be included in the channel.

The tags 152, in exemplary embodiments, may be provided in metadata generated by the platform 16. Such content metadata tags may include, for example, without limitation, tags 152 that specify the context of the activity and its location. Alternatively, or additionally, the tags 152 may include rights that the user 26 associates with their content 128, such as, but not limited to, the user's 26 choice between privacy or exposure (and the subsequent rewards that exposure brings such as profile raising and the ability to monetize their content 128.). Such tags 152 may, alternatively, or additionally, indicate assignment of ownership. A single content clip 128 may be simultaneously attributed to two or more separate users 26, such as, but not necessarily limited to, an athlete user 26 and a videographer user 26.

The platform 16 may be configured to provide a messaging function between users 26. Users 26 may be able to compose and transmit messages to other users 26. Users 26 may be able to communicate with internal messaging, and share messages, and links to profiles, videos 128, and challenges 134, for example. Users 26 may be able to report other users 26 for inappropriate content, advertising, or other reasons. Users 26 may be able to block other users 26 that they wish not to accept messages from.

Figure 12:
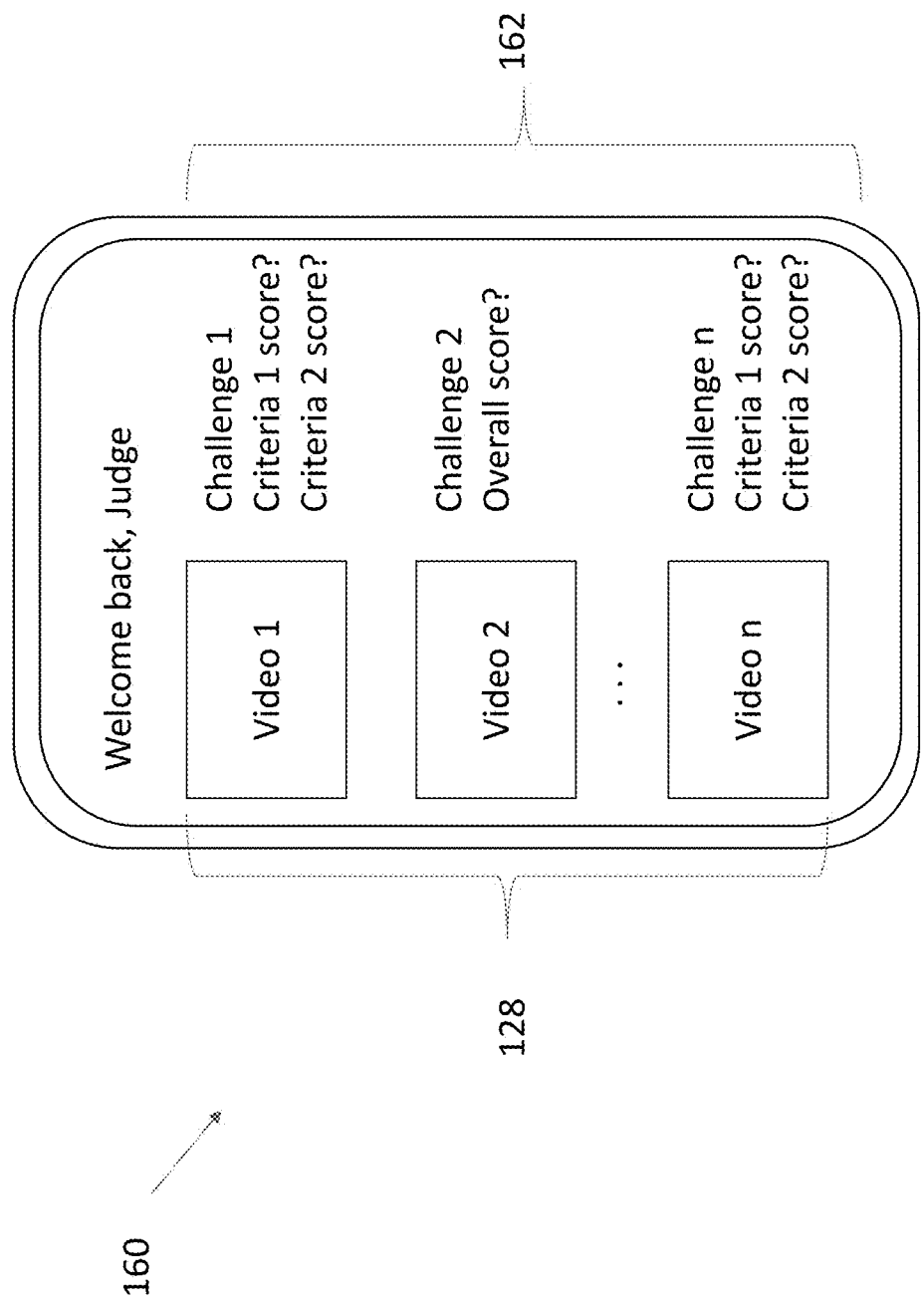
FIG. 12 is a plan view of an exemplary judging page for the platform.

FIG. 12 illustrates an exemplary judging page 160. The platform 16 may be configured to permit certain users 26 who are appointed as judges to access the judging page 160, which may be set as a default home page for such users 26 in exemplary embodiments, though such is not required. The platform 16 may be configured to display content 128 associated with challenges 134 associated with the appointed judge users 26 for viewing and scoring. The content 128 may be viewed individually, or as part of a highlight reel 132. The judging page 160 may prompt the judging user 26 to view the content 128 and provide scoring. Scoring may be an overall score, or scores for one or more specific criteria. Any number and type of criteria may be utilized including, for example and without limitation, difficulty, style, finesse, height, hang time, landing, takeoff, presentation, comedic factor, technique, combinations thereof, or the like. The platform 16 may be configured to prompt the judge user 26 to provide scoring based on criteria specific to the challenges 134 associated with the judge user 26. The platform 16 may be configured to display scoring guidelines in association with the prompt for the judging user 26 to enter scores.

Figure 13:
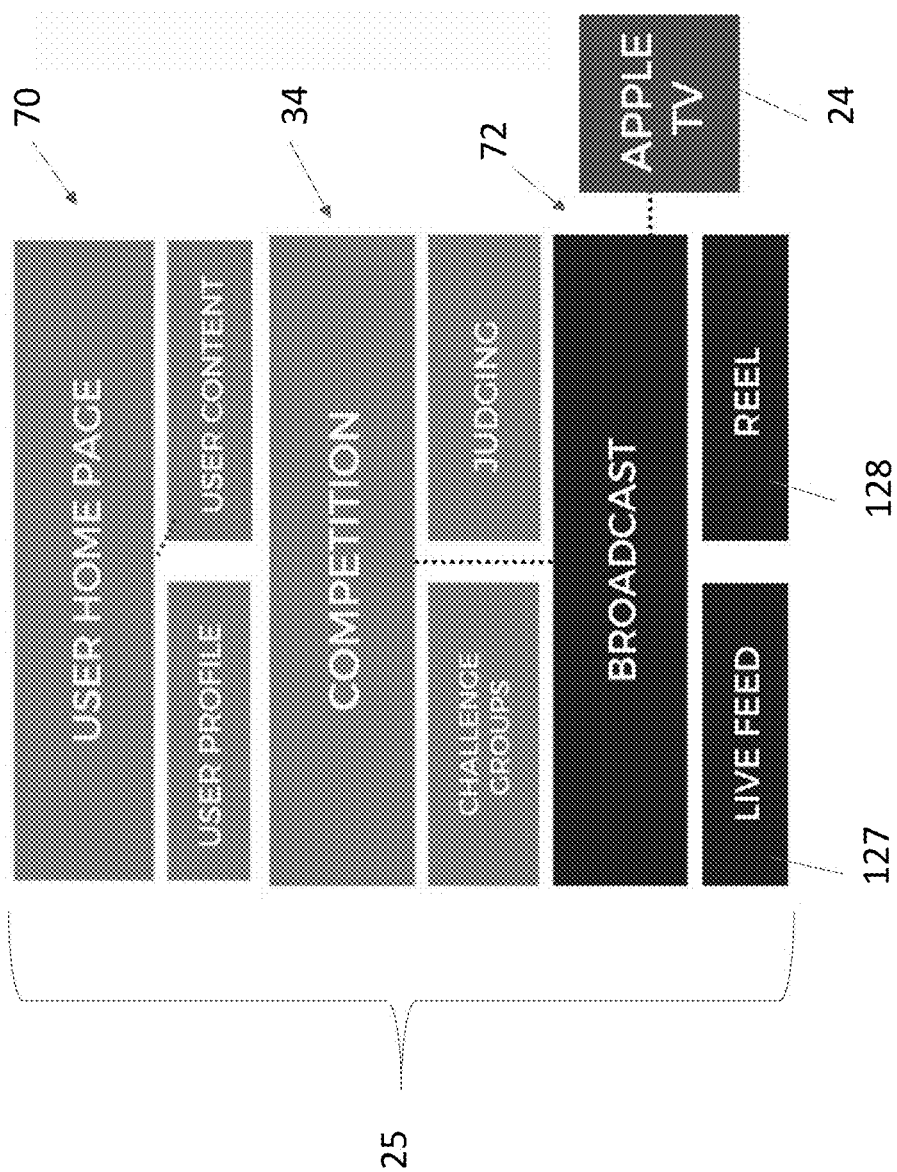
FIG. 13 is a plan view of exemplary user environments for the platform of FIG. 1.

FIG. 13 illustrates exemplary user environments 25 generated by the platform 16. Such environments 25 may include one or more home pages 70, at least some of which may be specific to various users 26 of the platform 16. For example, home pages 70 may be specific to user 26 interests, type of user 26 (e.g., viewer, content contributors 20, judge, etc.), combinations thereof, or the like. The home pages 70 of at least some users 26, such as content contributors 20, may comprise features for uploading content 128 to the platform 16. The home pages 70 of at least some users 26, such as viewers and/or judges, may comprise features for providing feedback to content 128, such as of content 128 of other users 26, including but not limited to by sharing, liking, rating, judging, scoring, combinations thereof, or the like.

Alternatively, or additionally, such environments 25 may include one or more competition pages 34. Each competition page 34, in exemplary embodiments, may include a group for a challenge 134 and/or associated judging. This may support the formation of multiple, dedicated niche groups for content 128 sharing. These groups may be staged simultaneously and/or in a linear fashion. User 26 may be able to configure each group to support a specific challenge 134, such as a particular surfing move or skate maneuver to provide some non-limiting examples and/or options to appoint expert commentators as judging users 26 to ensure skill is rewarded as well as popularity.

Alternatively, or additionally, such environments 25 may include one or more broadcast feeds 72. The broadcast feeds 72 may comprise live streaming 127 and/or reels 132, which may feature high quality content generated from the content 128 on the platform 16, such as on the home pages 70 and/or competition pages 34, and/or curated through user 26 interaction on the platform 16, such as by competition, feedback, and/or judging. This may enhance consenting athletes' and videographers' exposure and provide monetization opportunities. Live streaming 127 may be hosted by the platform 16 and/or media providers 24.

Figure 14:
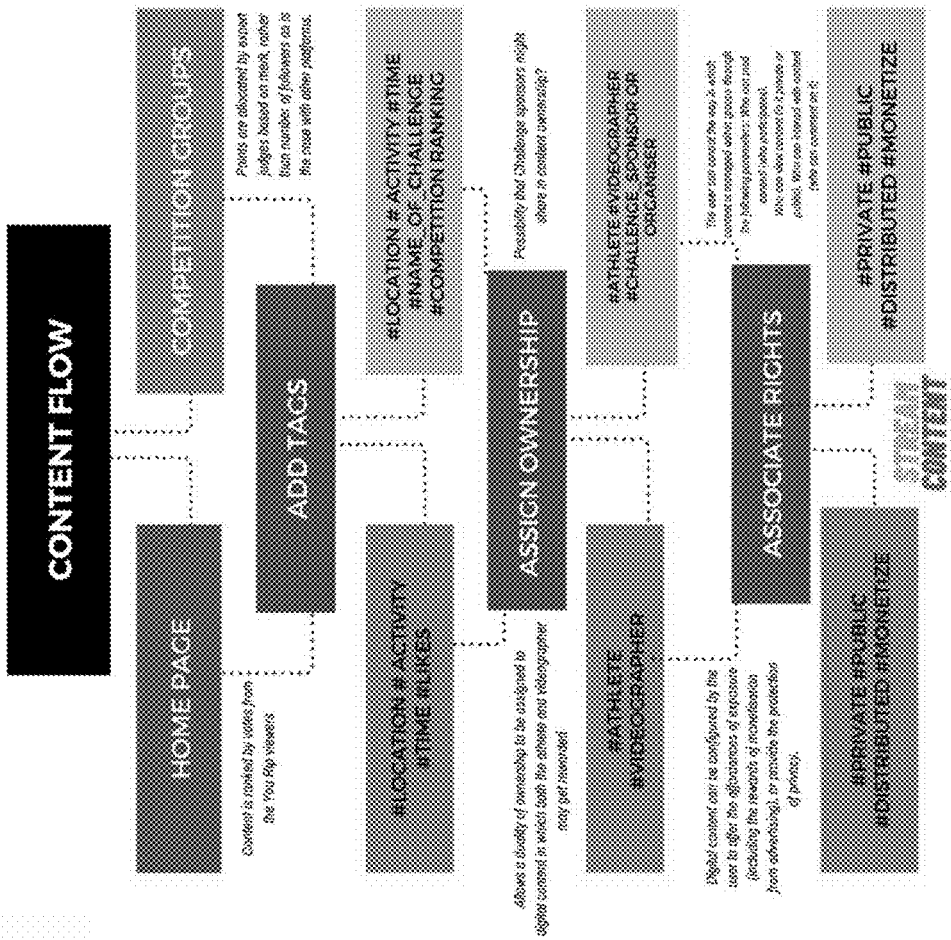
FIG. 14 is a flow chart with exemplary operation of the platform.

FIG. 14 illustrates exemplary operation of the platform 16. The home pages 70 and/or the competition pages 34 may produce content 128 that can be fed into the broadcast feeds 72 (e.g., live streaming 127, production of reels 132, external streaming or broadcast to or by third party (such as but not limited to media providers 24), combinations thereof, or the like). In exemplary embodiments, the content 128 selected for such broadcast feeds 72 is derived by a process which causes the most desirable content 128 for monetization to be identified. The challenges 134 may be configured to produce content 128 that is the result of a dedicated endeavor to be the best at a specific technique, to have gone through the process of competition, of judging, of victory (and sometimes defeat). Prizes may be allocated for merit, rather than number of followers. The process of assigning rights to the content 128, including for privacy, ownership, or exposure, for each athlete and/or videographer may be accomplished by the platform 16.

In exemplary embodiments, without limitation, content 128 may be uploaded to the platform 16 from the home pages 70 and/or the competition pages 34. User 26 interaction with the content 128 may be permitted, such as through viewing at various pages, including but not limited to competition pages 34 for challenges 134. Tags 152 may be associated with the content, such as but location, activity, time of upload, viewing, sharing, etc., likes, name of challenge, ranking in competition, or the like. Tags 152 may be hashtags, metadata, combinations thereof, or the like. Ownership and/or rights may be assigned to the content 128, such that the platform 16, athlete and/or videographer users 26 retain sufficient respective rights and/or control of the content 128 for monetization and/or dissemination purposes. In this fashion, athlete and/or videographer user 26 may elect in what manner their content 128 is shared, whether or not it is monetized, combinations thereof, or the like.

The platform 16, having an ownership interest in some or all of the rights to the content 128, may act as a managing agent for the content generators 20 and their work. For example, an entity may contact the platform 16 owners or operators about using content 128 in various endeavors. Rights to use such content 128 may be provided by the platform 16 and compensation disbursed to content generators 20, such as by way of the financial systems 118 accordingly. The terms of such arrangements may be provided automatically in an electronic terms of use agreement with users 26, such as content generators 20, and may include auto generated assignment documents. The automatically generated assignment documents may include description and other information extracted from entered information, the user's 26 profile, uploaded content 128 (such as, but not limited to, from meta data or other embedded information), combinations thereof, or the like, and may be electronically executed at stored at the servers 116, for example without limitation.

In exemplary embodiments, image recognition software and/or audio recognition software may be utilized to recognize items within the content 128 and associate the content 128 with appropriate tags 152. For example, without limitation, artificial intelligence, automatic speech recognition, and/or machine vision techniques may be utilized to sort uploaded content 128 by sport, athlete, or other category. Alternatively, or additionally, existing metadata or other embedded data may be used to assign and associate tags 152, such as but not limited to, geolocation, capturing device information, identifying information, image type, image quality, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like, configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for providing user generated and curated video content streaming on-demand through a digital competition environment, said system comprising:

a number of electronic devices, each comprising at least one electronic display and associated with a user, wherein each of a first portion of said users comprise content generators comprising extreme sports athletes and videographers, and wherein each of a second portion of said users comprise fans;

one or more financial systems, each configured to selectively disburse funds to various accounts of various financial institutions or individuals;

one or more advertiser systems, each configured to provide advertising content;

one or more servers configured to host a platform comprising one or more websites or applications for access by said number of electronic devices, wherein said one or more servers comprise software instructions, which when executed, configure one or more processors to:

cause information regarding challenges to be displayed at said platform, wherein each of said challenges is associated with at least one tag;

receive, in association with particular ones of said challenges, video clips uploaded by said number of content generators by way of said number of personal electronic devices;

associate said video clips associated with said at least one tag of the associated one of said challenges for which each one of said video clips is received;

format said video clips;

make said video clips available for interaction by said fans by way of watch pages of said platform at said second portion of said number of personal electronic devices;

select, by way of an evaluation module, certain ones of said video clips for incorporation into one or more of a number of highlight reels;

automatically insert said advertising content from said one or more advertiser systems into at least certain of said number of highlight reels;

receive, by way of said one or more financial systems, payments for said advertising content; and disburse, by way of said one or more financial systems, a portion of said payments received to accounts of financial institutions associated with said content generators associated with said video clips of said highlight reels incorporating said advertising content.

2. The system of claim 1 further comprising:

one or more media systems in electronic communication with said one or more servers and associated with one or more media providers, wherein said one or more media systems are configured to:
  receive at least select ones of said highlight reels from said one or more servers;
  provide, by way of said one or more financial systems, payments for said select ones of said highlight reels; and
  broadcast said select ones of said highlight reels for viewing by passive viewers at other electronic devices; and
additional software instructions located at said one or more servers, which when executed, configure the one or more processors to disburse, by way of said one or more financial systems, a portion of said payments received from said one or more media providers to said accounts of said financial institutions associated with said content generators associated with said video clips of said highlight reels provided to said one or more media systems.

3. The system of claim 2 wherein:
select ones of said highlight reels contain none of said advertising content.

4. The system of claim 1 wherein:
a portion of said challenges comprise sponsored challenges;
each of said sponsored challenges is supported by at least one brand;
said one or more servers comprise additional software instructions, which when executed, configure the one or more processors to:
  receive payment for available prize money, by way of said one or more financial systems, from each of said brands associated with each of said sponsored challenges;
  cause information regarding said available monetary prizes to be provided at said platform for each of said sponsored challenges;
  receive ratings for each of said video clips received in association with each of said sponsored challenges from at least certain of said users;
  determine one or more winners of each of said sponsored challenges based on said received ratings; and
  disburse, by way of said one or more financial systems, said available prize money to said one or more winners of each of said sponsored challenges.

5. The system of claim 4 wherein:
said one or more servers comprise additional software instructions, which when executed, configure the one or more processors to provide an option for an administrator credentialed one or said user to appointed certain other ones of said users as judges for each one of said sponsored challenges; and
only said ratings received from said users appointed as judges for each one of said sponsored challenges are used to determined said one or more winners for each one of said sponsored challenges.

6. The system of claim 1 wherein:
said one or more servers comprise additional software instructions, which when executed, configure the one or more processors to format said received video clips by configuring said received video clips for horizontal viewing and placing said received video clips into high definition, progressive scan format.

7. The system of claim 1 wherein:
said one or more servers comprise additional software instructions, which when executed, configure the one or more processors to:
make said video clips available for interaction by:
  providing an option to share said video clips at said platform;
  providing an option to rate said video clips on a scale of 1 to 10 at said platform; and
  providing an option to view said video clips at said platform;
record which of said video clips are selected for sharing;
record ratings given to said video clips;
record a number of times each of said video clips is viewed;
select, by way of said evaluation module, said certain ones of said received video clips for incorporation into said various highlight reels specific to said sponsored challenges by:
  receiving indication of a tag of interest;
  selecting said video clips most recorded as shared and associated with said tag of interest until exhausted;
  selecting said video clips having a highest rating of at least 6 or above and associated with said tag until exhausted; and
  selecting said video clips recorded as most viewed and associated with said tag until exhausted.

8. The system of claim 7 wherein:
said tag of interest is a tag associated with a particular one of said video clips shared by a particular one of said second portion of said users; and
said number of highlight reels are displayed at said second portion of said number of personal electronic devices.

9. The system of claim 7 wherein:
said tag of interest is a tag associated with a particular one of said video clips rated by a particular one of said second portion of said users at a 6 or above; and
said number of highlight reels are displayed at said second portion of said number of personal electronic devices.

10. The system of claim 7 wherein:
said tag of interest is a tag associated with a category or location indicated as of interest by a particular one of said second portion of said users; and
said number of highlight reels are displayed at said second portion of said number of personal electronic devices.

11. The system of claim 1 wherein:
said one or more servers comprise additional software instructions, which when executed, configure the one or more processors to:
  permit each of said first portion of said users to choose whether or not they wish to receive monetary compensation; and
  only disburse payments to those ones of said first portion of said users who indicate a desire to receive monetary compensation.

12. The system of claim 1 wherein:
said one or more servers comprise additional software instructions, which when executed, configure the one or more processors to:

permit each of said users to choose whether or not they wish to make their activity on the platform public; and only permit activity of said users who elect to make their activity publicly available for viewing by other users of the platform.

13. The system of claim 1 wherein:
said one or more servers are configured to maintain one or more databases of each of said video clips received by said platform, each of said content generators associated with each of said video clips, and each of said video clips incorporated into each of said highlight reels for use by said one or more financial systems to facilitate electronic disbursement of payment.

14. A method for providing user generated and curated video content streaming on-demand through a digital competition environment, said method comprising the steps of:
  causing information regarding challenges to be electronically displayed at a platform comprising one or more websites or applications hosted at one or more servers, wherein each of said challenges is associated with at least one tag;
  electronically receiving, in association with particular ones of said challenges and by way of said platform, video clips uploaded by a number of content generators by way of a first portion of a number of personal electronic devices;
  electronically associating said video clips associated with said at least one tag of the associated one of said challenges for which each one of said video clips is received;
  digitally formatting said video clips for electronic display;
  making said video clips available for electronic interaction by fans associated with a second portion of said number of personal electronic devices by way of watch pages of said platform at said second portion of said number of personal electronic devices;
  automatically selecting, by way of an evaluation module, certain ones of said video clips for incorporation into one or more of a number of highlight reels generated by said platform;
  automatically inserting advertising content provided by way of one or more advertiser systems into at least certain of said number of highlight reels;
  electronically receiving, by way of said one or more financial systems, payments from advertisers for incorporation of said advertising content into said certain of said highlight reels;
  electronically and automatically identifying said content generators associated with said video clips of said highlight reels incorporating said advertising content; and
  electronically and automatically disbursing, by way of said one or more financial systems, a portion of said payments received to accounts of financial institutions associated with said identified ones of said content generators.

15. The method of claim 14 further comprising the steps of:
  electronically receiving at least select ones of said highlight reels from said one or more servers at one or more media systems in electronic communication with said one or more servers and associated with one or more media providers;
  electronically and automatically providing, by way of said one or more financial systems, payments for said select ones of said highlight reels;
  broadcasting, by way of said one or more media systems, said select ones of said highlight reels for viewing by passive viewers at other electronic devices;
  electronically and automatically identifying said content generators associated with said video clips of said select ones of highlight reels provided to said media providers; and
  electronically and automatically disbursing, by way of said one or more financial systems, a portion of said payments received from said one or more media providers to accounts of financial institutions associated with said content generators associated with said video clips of said select ones of highlight reels.

16. The method of claim 14 further comprising the steps of:
  establishing at least some of said challenges as sponsored challenges, wherein each of said sponsored challenges is supported by at least one brand;
  electronically receiving payment for available prize money, by way of said one or more financial systems, from each of said brands associated with each of said sponsored challenges;
  causing information regarding said available monetary prizes to be provided at said platform for each of said users to view in association with each of said sponsored challenges;
  electronically receiving, by way of said platform, ratings for each of said video clips received in association with each of said sponsored challenges from at least certain of said users;
  electronically and automatically determining, at said platform, one or more winners of each of said sponsored challenges based on said received ratings; and
  electronically and automatically disbursing, by way of said one or more financial systems, said available prize money to said one or more winners of each of said sponsored challenges.

17. The method of claim 16 further comprising the steps of:
  electronically appointing certain of said users as judges for said sponsored challenges, wherein only said ratings received from said users appointed as judges for each one of said sponsored challenges are used to determined said one or more winners for each one of said sponsored challenges.

18. The method of claim 14 wherein:
said step of formatting said video clips comprises configuring said video clips for horizontal viewing and placing said received video clips into high definition, progressive scan format.

19. The method of claim 14 wherein:
the steps of making said video clips available for interaction comprises:
  providing an option to share said video clips at said platform;
  providing an option to rate said video clips on a scale of 1 to 10 at said platform; and
  providing an option to view said video clips at said platform;
the step of selecting certain ones of said video clips for incorporation into one or more of said number of highlight reels comprises:
  recording which of said video clips are selected for sharing;
  recording ratings given to said video clips;
  recording a number of times each of said video clips is viewed;

receiving indication of a tag of interest;

selecting said video clips most recorded as shared and associated with said tag of interest until exhausted;

selecting said video clips having a highest rating of at least 6 or above and associated with said tag until exhausted; and selecting said video clips recorded as most viewed and associated with said tag until exhausted.

20. A system for providing user generated and curated video content streaming on-demand through a digital competition environment, said system comprising:

a number of electronic devices, each comprising at least one electronic display and associated with a user, wherein each of a first portion of said users comprise content generators comprising athletes and videographers, and wherein each of a second portion of said users comprise fans;

one or more financial systems, each configured to selectively disburse funds to various accounts of various financial institutions or individuals;

one or more advertiser systems, each configured to provide advertising content;

one or more servers configured to host a platform comprising one or more websites or applications for access by said number of electronic devices, wherein said one or more servers comprise software instructions, which when executed, configure one or more processors to:

receive information for profiles for each of said users, wherein said profiles associated with said content generators comprises an indication of whether said content generator is an athlete or a videographer;

receive electronic consent to a user agreement for each of said users, wherein said user agreement specifies payments to be made to said users under specific circumstances identified as content generators specific to identification as an athlete or a videographer;

cause information regarding challenges to be displayed at said platform, wherein each of said challenges is associated with at least one tag;

receive, in association with particular ones of said challenges, video clips uploaded by said number of content generators by way of said number of personal electronic devices;

associate said video clips associated with said at least one tag of the associated one of said challenges for which each one of said video clips is received;

format said video clips;

make said video clips available for interaction by said fans by way of watch pages of said platform at said second portion of said number of personal electronic devices;

select, by way of an evaluation module, certain ones of said video clips for incorporation into one or more of a number of highlight reels;

automatically insert said advertising content from said one or more advertiser systems into at least certain of said number of highlight reels;

receive, by way of said one or more financial systems, payments for said advertising content; and disburse, by way of said one or more financial systems, a portion of said payments received to accounts of financial institutions associated with said content generators associated with said video clips of said highlight reels incorporating said advertising content; and one or more media systems in electronic communication with said one or more servers and associated with one or more media providers, wherein said one or more media systems are configured to:

receive at least select ones of said highlight reels from said one or more servers;

provide, by way of said one or more financial systems, payments for said select ones of said highlight reels; and broadcast said select ones of said highlight reels for viewing by passive viewers at other electronic devices; and additional software instructions located at said one or more servers, which when executed, configure the one or more processors to disburse, by way of said one or more financial systems, a portion of said payments received from said one or more media providers to said accounts of said financial institutions associated with said content generators associated with said video clips of said highlight reels provided to said one or more media systems.

* * * * *

UNITED STATES PATENT AND TRADEMARK OFFICE
CERTIFICATE OF CORRECTION

| | | |
|---|---|---|
| PATENT NO. | : 11,432,052 B1 | Page 1 of 1 |
| APPLICATION NO. | : 17/486176 | |
| DATED | : August 30, 2022 | |
| INVENTOR(S) | : Patrick Furlotti et al. | |

It is certified that error appears in the above-identified patent and that said Letters Patent is hereby corrected as shown below:

In the Specification

Column 6, Line 53, please delete "1268" and insert -- 126B --.
Column 6, Line 63, please delete "1268" and insert -- 126B --.

Signed and Sealed this
First Day of November, 2022

*Katherine Kelly Vidal*

Katherine Kelly Vidal
*Director of the United States Patent and Trademark Office*